United States Patent
Dice et al.

(10) Patent No.: US 12,099,885 B2
(45) Date of Patent: *Sep. 24, 2024

(54) SYSTEM AND METHOD FOR PROMOTING READER GROUPS FOR LOCK COHORTING

(71) Applicant: Oracle International Corporation, Redwood City, CA (US)

(72) Inventors: David Dice, Foxboro, MA (US); Virendra J. Marathe, Florence, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,880

(22) Filed: Aug. 4, 2023

(65) Prior Publication Data

US 2023/0401113 A1 Dec. 14, 2023

Related U.S. Application Data

(63) Continuation of application No. 17/547,956, filed on Dec. 10, 2021, now Pat. No. 11,762,711, which is a (Continued)

(51) Int. Cl.
*G06F 9/52* (2006.01)
*G06F 9/46* (2006.01)
(Continued)

(52) U.S. Cl.
CPC ............. *G06F 9/526* (2013.01); *G06F 9/468* (2013.01); *G06F 9/52* (2013.01); *G06F 16/176* (2019.01);
(Continued)

(58) Field of Classification Search
None
See application file for complete search history.

(56) References Cited

U.S. PATENT DOCUMENTS 10,042,679 B2 8/2018 Dice et al.
2013/0290583 A1 10/2013 Dice et al.
(Continued)

FOREIGN PATENT DOCUMENTS

WO 97/06484 2/1997

OTHER PUBLICATIONS

"NUMA-Aware Locking Routines—Design and Implementation in Linux", Retrieved from URL: https://sourceforge.net/projects/lse/files/NUMA/mtg.2001.07.25/numalocks.ppt/download?use_mirror=master, pp. 1-10.
(Continued)

*Primary Examiner* — Qing Yuan Wu
(74) *Attorney, Agent, or Firm* — Robert C. Kowert; Kowert, Hood, Munyon, Rankin & Goetzel, P.C.

(57) ABSTRACT

NUMA-aware reader-writer locks may leverage lock cohorting techniques that introduce a synthetic level into the lock hierarchy (e.g., one whose nodes do not correspond to the system topology). The synthetic level may include a global reader lock and a global writer lock. A writer thread may acquire a node-level writer lock, then the global writer lock, and then the top-level lock, after which it may access a critical section protected by the lock. The writer may release the lock (if an upper bound on consecutive writers has been met), or may pass the lock to another writer (on the same node or a different node, according to a fairness policy). A reader may acquire the global reader lock (whether or not node-level reader locks are present), and then the top-level lock. However, readers may only hold these locks long enough to increment reader counts associated with them.

20 Claims, 10 Drawing Sheets

Related U.S. Application Data continuation of application No. 16/812,165, filed on Mar. 6, 2020, now Pat. No. 11,226,849, which is a continuation of application No. 16/056,094, filed on Aug. 6, 2018, now Pat. No. 10,585,719, which is a continuation of application No. 15/012,505, filed on Feb. 1, 2016, now Pat. No. 10,042,679.

(51) Int. Cl.
    *G06F 9/50*     (2006.01)
    *G06F 13/16*     (2006.01)
    *G06F 16/176*     (2019.01)
    *G06F 16/23*     (2019.01)

(52) U.S. Cl.
    CPC ...... *G06F 16/1767* (2019.01); *G06F 16/1774* (2019.01); *G06F 16/2343* (2019.01); *G06F 9/50* (2013.01); *G06F 13/1605* (2013.01)

(56) References Cited

U.S. PATENT DOCUMENTS

2013/0290967 A1    10/2013    Calciu et al.
2022/0100587 A1    3/2022    Dice et al.

OTHER PUBLICATIONS

Sergey Blagodurov, et al., "A Case for NUMA-aware Contention Management on Multicore Systems", USENIX Association, 2011 USENIX Annual Technical Conference (USENIX ATC '11), 2011, pp. 1-15.
Anat Agarwal, et al., "Adaptive Backoff Sychronization Techniques", Laboratory for Computer Science, Appears in the 16th Annual Symposium on Computer Architecture, Jun. 1989, pp. 1-24.
Travis S. Craig, "Building FIFO and Priority-Queuing Spin Locks from Atomic Swap", Technical Reort 93-02-02, 1994, pp. 1-29.
Davd Dice, et al., "Mostly Lock-Free Malloc", ACM SIGPLAN Notices, vol. 38, No. 2 Supplement, 2002, pp. 163-174.
Dave Dice, et al., "Flat-Combining NUMA Locks", ACM, In the Proceedings of the Twenty-third Annual ACM Symposium on Parallelism in Algorithms and Architectures, 2011, pp. 65-74.
Danny Hendler, et al., "Flat Combining and the Synchronzation-Parallelism Tradeoff", ACM, SPAA'10, Jun. 13-15, 2015, pp. 1-10.
Martin Pohlack, et al., "From Lightweight Hardware Transactional Memory to Lightweight Lock Elision", ACM, In the Proceedings of the 6th ACM SIGPLAN Workshop on Transactional Computing, 2011, pp. 1-7.
Zoran Radovic, et al., "Hierarchial Backoff Locks for Nonuniform Communication Architectures", IEEE, High-Performance Computer Architecture, HPCA-9 2003 Proceedings, The Ninth International Symposium, 2003, pp. 241-252.
Michael L. Scott, et al., "Scalable Queue-Based Spin Locks with Timeout", ACM, PPOPP'01, Jun. 18-20, 2001, pp. 1-9.
Victor Luchangco, et al., "A Hierarchical CLH Queue Lock", In Euro-Par 2006 Parallel Processing, 2006, pp. 801-810.
Y. Oyama, et al., "Executing Parallel Programs with Synchronization Bottlenecks Efficiently", Proceedings of International Workshop on Parallel and Distributed Computing for Symbolic and Irregular Applications (PDSIA'99), World Scientific, 1999, pp. 1-23.
Yossi Lev, et al., "Scalable Reader-Writer Locks", ACM, SPAA'09, Aug. 11-13, 2009, pp. 1-10.
John M. Mellor-Crummey, et al., "Scalable Reader-Writer Synchronization for Shared-Memory Multiprocessors", ACM, ACM SIGPLAN Notices, vol. 26, No. 7, 1991, p. 106-113.
John M. Mellor-Crummey, et al., "Synchronization Without Contention", ACM, ACM SIGARCH Computer Architecture News, vol. 19, No. 2, 1991, pp. 269-278.
P. Courtois, et al., "Concurrent Control with "Readers" and Writers", ACM, Communication of the ACM 14.10, Oct. 1971. pp 1-9.
WC Hsieh, et al., "Scalable Reader-Writer Locks for Parallel Systems", IEEE, Parallel Processing Symposium, Proceeding Sixth International, 1992, pp. 1-18.
Orran Krieger, et al., "A Fair Fast Scalable Reader-Writer Lock", International Conference on Parallel Processing, 1993, pp. 1-4.
Dave Dice, "TLRW: Return of the Read-Write Lock", ACM, In the Proceedings of the Twenty-Second Annual ACM Symposium on Parallelism in Algorithms and Architectures, 2010, pp. 284-293.
Dave Dice, et al., "Lock Cohorting: A General Technique for Designing NUMA Locks", ACM, ACM Transactions on Parallel Computing, vol. 1, No. 2, Jan. 2015, pp. 1-42.
Dave Dice, "Oracle: Cohort Locks and Multicore Ramblings", http://blogs.oracle.com/dave, MIT, Mar. 7, 2015, pp. 1-45.
Irina Calciu, et al., "NUMA-Aware Reader-Writer Locks", ACM, PPoPP'13, Feb. 23-27, 2013, pp. 1-10.
Dice et al., "Lock Cohorting: A General Technique for Designing NUMA Locks", Feb. 25-29, 2012, ACM, pp. 1-10.

SYSTEM AND METHOD FOR PROMOTING READER GROUPS FOR LOCK COHORTING

This application is a continuation of U.S. patent application Ser. No. 17/547,956, filed on Dec. 10, 2021, which is a continuation of U.S. patent application Ser. No. 16/812,165, filed Mar. 6, 2020, now U.S. Pat. No. 11,226,849, which is a continuation of U.S. patent application Ser. No. 16/056,094, filed Aug. 6, 2018, now U.S. Pat. No. 10,585,719, which is a continuation of U.S. patent application Ser. No. 15/012,505, filed Feb. 1, 2016, now U.S. Pat. No. 10,042,679, which are hereby incorporated by reference herein in their entirety.

BACKGROUND

Field of the Disclosure

This disclosure relates generally to reader-writer locks, and more particularly to systems and methods for promoting reader groups for lock cohorting with reader-writer locks.

Description of the Related Art

In a multiprocessor environment with threads and preemptive scheduling, threads can participate in a mutual exclusion protocol through the use of lock or "mutex" constructs. A mutual exclusion lock can either be in a locked state or an unlocked state, and only one thread can hold or own the lock at any given time. The thread that owns the lock is permitted to enter a critical section of code protected by the lock or otherwise access a shared resource protected by the lock. If a second thread attempts to obtain ownership of a lock while the lock is held by a first thread, the second thread will not be permitted to proceed into the critical section of code (or access the shared resource) until the first thread releases the lock and the second thread successfully claims ownership of the lock.

Current trends in multicore architecture design imply that in coming years, there will be an accelerated shift away from simple bus-based designs towards distributed non-uniform memory-access (NUMA) and cache-coherent NUMA (CC-NUMA) architectures. Under NUMA, the memory access time for any given access depends on the location of the accessed memory relative to the processor. Such architectures typically consist of collections of computing cores with fast local memory (as found on a single multicore chip), communicating with each other via a slower (inter-chip) communication medium. In such systems, the processor can typically access its own local memory, such as its own cache memory, faster than non-local memory. In some systems, the non-local memory may include one or more banks of memory shared between processors and/or memory that is local to another processor. Access by a core to its local memory, and in particular to a shared local cache, can be several times faster than access to a remote memory (e.g., one located on another chip). Note that in various descriptions herein, the term "NUMA" may be used fairly broadly. For example, it may be used to refer to non-uniform communication access (NUCA) machines that exhibit NUMA properties, as well as other types of NUMA and/or CC-NUMA machines.

On large cache-coherent systems with Non-Uniform Memory Access (CC-NUMA, sometimes shortened to just NUMA), if lock ownership migrates frequently between threads executing on different nodes, the executing program can suffer from excessive coherence traffic, and, in turn, poor scalability and performance. Furthermore, this behavior can degrade the performance of other unrelated programs executing in the system.

Reader-writer locks are an important category of locks that help programmers overcome the scalability issues that are common with traditional mutual exclusion locks for workloads that include a significant percentage of read-only critical sections of code. At any given time, a reader-writer lock allows one or more reader threads to own a lock in a read-only mode or just one writer thread to own the lock in a write mode. In one very basic implementation of a reader-writer lock, there is a single variable to indicate the synchronization object. When there are multiple simultaneous lock acquisitions in read-only mode, this variable indicates number of reader threads. However, when there is an exclusive lock acquisition for writer thread, this variable indicates an address or other identifier of the writer thread.

With reader-writer locks, read-only or write access permission persists until it is explicitly surrendered using an unlock operation. Past research has shown that even though these locks can scale well for workloads with very high reader volumes (e.g., on the order of 99-100% reader threads), the performance quickly drops off with even a modest number of writer threads (e.g., 5-10%) competing for the lock. This drop-off can be expected to be even worse on cache-coherent NUMA architectures, where the writer threads can introduce significant interconnect traffic and latencies to access remotely situated lock metadata and data that is accessed in a related critical section of code. A reader-writer lock might provide better performance than a traditional mutex, as the reader-writer lock can admit multi-reader (reader-reader) parallelism. However, any actual benefit would be contingent on the workload of the executing application, the availability of true parallelism, and the specific implementation of the reader-writer lock.

SUMMARY

In various embodiments, NUMA-aware reader-writer locks that control access to critical sections of code by concurrently executing threads in read-only mode and in write mode may leverage lock cohorting techniques to band together writer requests that originate from a single NUMA node. In some embodiments, a synthetic level may be introduced into the lock hierarchy for these locks (e.g., one whose nodes do not correspond to the nodes or topology of the NUMA system on which they are implemented). The cohort-s locks described herein may improve throughout and/or performance by grouping together writers executing on the same node and by promoting the formation of groups of reader threads (executing on the same node or on different nodes). In some embodiments, the locks may apply a neutral preference policy (e.g., one that favors neither readers nor writers). In some embodiments, by specifying bounds on consecutive readers and/or writers, an application developer that employs these locks may be able to control the balance between readers and writers and between threads executing on different nodes. For example, the application developer may specify a different upper bound on the number of consecutive readers than the upper bound on the number of consecutive writers and may be able to modify those bound during operation, in some embodiments.

In some embodiments, the reader-writer locks described herein may implement a multiple-level lock hierarchy, which may include a top-level reader-writer lock, multiple node-level locks, and a synthetic level between the top-level and the node-level locks. The synthetic level may include a global reader lock and a global writer lock. A writer thread that wishes to access the critical section of code protected by the lock may first acquire its node-level writer lock, then the global writer lock, and then the top-level lock, after which it may access the critical section. The writer may then release the lock (if an upper bound on consecutive writers has been met), or may pass the lock to another writer (if an upper bound on consecutive writers has not yet been met). The writer may pass ownership of the lock to another writer on the same node or a different node, according to a node-level fairness policy. For example, if an upper bound on the number of consecutive writers on the same node has not yet been met, the writer may pass ownership of the lock to another writer on the same node. However, if the upper bound on the number of consecutive writers on the same node has been met, the writer may pass ownership of the lock to a writer on another node.

A reader thread that wishes to access the critical section may first acquire its node-level reader lock (if such locks are included in the lock hierarchy) or the global reader lock (if they are not), and then the top-level lock. However, reader threads may hold these locks only very briefly (e.g., long enough to increment reader counts associated with those locks) before releasing them again, after which they may access the critical section without having to hold the lock (as long as no writer holds the lock). In various embodiments, a reader thread may be able to pass ownership of the lock to any other reader thread. In other embodiments, a reader thread may pass ownership of the lock to readers on the same node or may release the lock.

Figure 1:
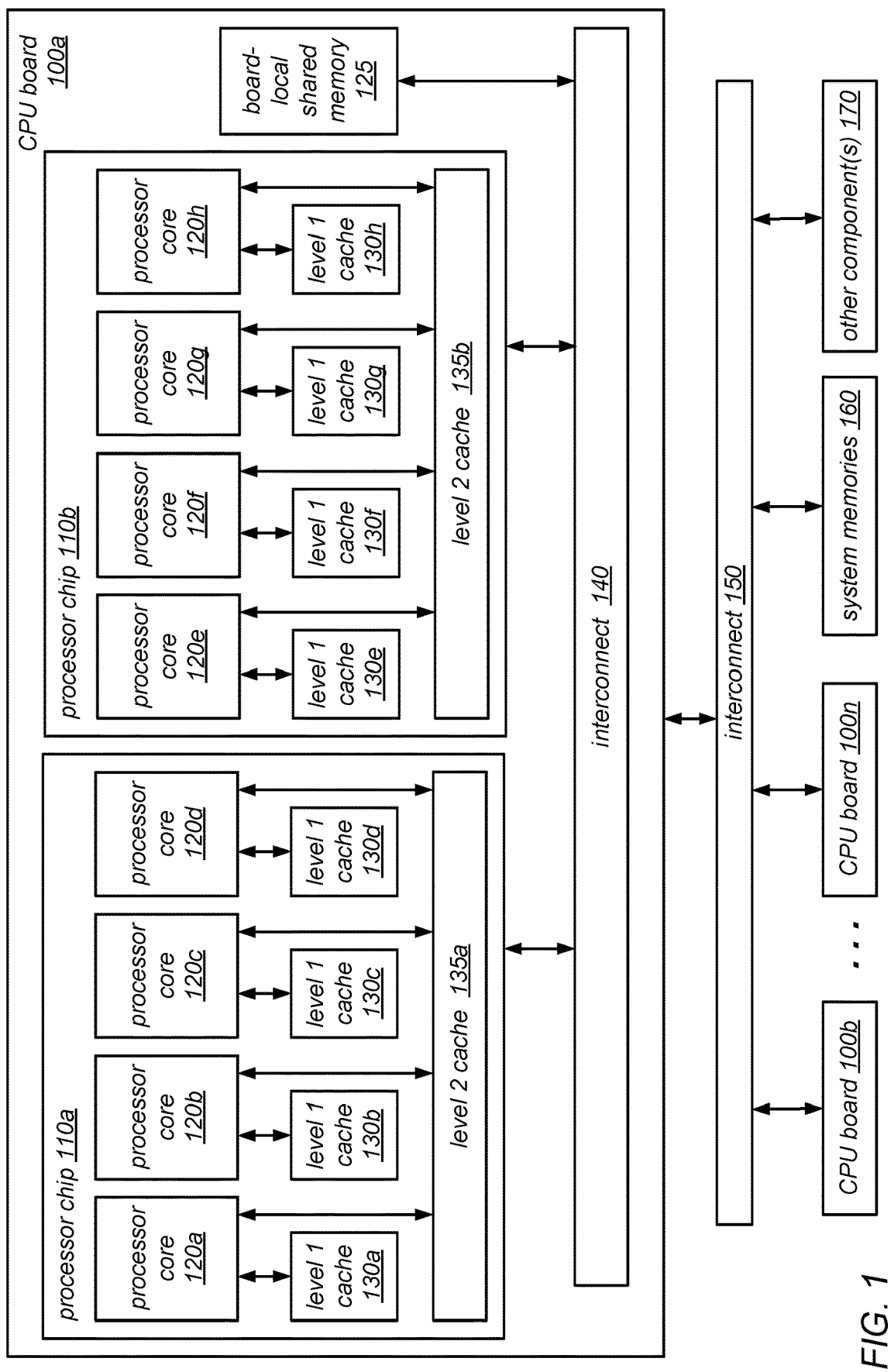
FIG. 1 is a block diagram illustrating a portion of a computer system that implements a NUMA style memory architecture, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As noted above, reader-writer locks are a class of mutual exclusion locks that permit simultaneous acquisition by more than one thread that intends to access the data protected by the locks in read-only mode or exclusive acquisition by one thread that requires write access to the data protected by the locks. The use of reader-writer locks may enable significantly greater concurrency (as compared to traditional mutual exclusion locks) between threads that acquire a reader-writer lock in read-only mode, and may thus result in much better scalability than can be achieved using traditional mutual exclusion locks. For example, in some embodiments, reader-writer lock may can scale well even on systems having many thousands of CPUs.

Broadly, reader-writer locks may be thought of in terms of a packing problem in which time passing is indicated on the X-axis and critical section occupation by process (or CPU) count is indicated on the y-axis. For a given reader-writer lock, for any given point or time interval, a goal may be to maximize the number of active reader threads. In this example, the area under the curve may reflect the throughput of the system. A goal may be to maximize throughput, while taking into account some constraints on fairness, where "fairness" may be thought of as the difference between arrival order and admission (entry) order over some interval (e.g., how far a lock deviates from strict FIFO ordering). Note that maximizing throughput may be thought of as equivalent to minimizing execution time. For example, if there is a backlog of pending read and write requests, a goal may be for the lock algorithm to schedule operations so that the backlog, plus any new requests that arrive, will be completed as soon as possible. In some embodiments, this may be achieved by "packing" reader threads so that multiple reader threads can run at the same time.

In the example descriptions included herein, it may be assumed that the system scheduler is fair and that the system is otherwise unloaded. It may also be assumed that the arrival rate at a lock is approximately uniform over the nodes in a system. In addition, it may be assumed that some amount of temporal reuse locality exists between critical section activations for the same lock. In other words, acquiring a lock L may be assumed to be a good predictor that the critical section that runs under lock L will access much of the same data as recent previous activations of critical sections that ran under lock L. In various embodiments, the thread scheduling criteria employed in the system may include the arrival time of the thread relative to other threads (e.g., its age), the NUMA origin of the invoking thread, and/or the type of operation (e.g., whether the thread intends to perform a read operation or a write operation).

In the descriptions that follow, an "R-group" may be defined as a set of active reader threads that execute concurrently. More precisely, an R-group may be defined as the transitive closure of a set of active reader threads that overlap in time. Increasing parallelism between reader threads (sometimes referred to herein as "reader-reader parallelism", or simply "R-R parallelism") may be functionally equivalent to increasing R-group sizes. A write-after-read (WAR) event occurs when an R-group finishes (i.e. when all of the reader threads in the R-group complete execution) and a writer thread executes. Note that each WAR event corresponds to an adjoining read-after-write (RAW) event. However, without loss of generality, the discussions that follow are restricted to the consideration of RAW events. High RAW rates may tend to decrease R-group sizes and limit R-R parallelism, since RAW alternation can disrupt strings of pending reader threads that could potentially run concurrently. Therefore, in some embodiments, for better performance, the rates of read-to-write and write-to-read alternation should be reduced. For the purposes of the discussions below, the following may be considered to be equivalent (i.e. to be equally beneficial to performance): increasing the size of an R-group, increasing R-R parallelism, and decreasing the read-after-write RAW alternation rate.

In some embodiments, a reader-writer lock implementation may incorporate policies that promote or otherwise encourage large R-group formation. For example, one tactic employed by these locks may be to allow a bounded number of reader threads to bypass or overtake writer threads that are blocked by an active R-group. In such embodiments, a newly arriving reader thread may be allowed to "jump over" the pending writer threads and join an active R-group. For example, if the arrival order at a reader-writer lock is as follows: reader thread r1, writer thread w1, reader thread r2, writer thread w2, reader thread r3, writer thread w3, reader thread r4, writer thread w4, reader thread r5, writer thread w5. In this example, the reader-writer lock may opt to reorder or reschedule the admission order as follows: writer thread w1, writer thread w2, writer thread w3, writer thread w4, writer thread w5, (reader thread r1, reader thread r2, reader thread r3, reader thread r4, reader thread r5), and the reader thread rX read operations may be able to run concurrently. As illustrated in this example, in some embodiments, a reader-writer lock may intentionally introduce and leverage unfairness in order to improve aggregate throughput.

As previously noted, Non-Uniform Memory Access (NUMA) architectures are gaining importance in mainstream computing systems due to the rapid growth of multi-core multi-chip machines. As microprocessor vendors aggressively pursue the production of bigger multi-core multi-chip systems, the computing industry is witnessing a shift toward distributed and cache-coherent NUMA architectures. As noted above, the term NUMA may be used broadly to include Non-Uniform Communication Architecture (NUCA) machines as well as Non-Uniform Memory Access architectures. These systems contain multiple nodes where each node has locally attached memory, a local cache and multiple processing cores. Such systems present a uniform programming model where all memory is globally visible and cache-coherent. The set of cache-coherent communications channels between nodes may be referred to collectively as the interconnect. These inter-node links may typically suffer from higher latency and lower bandwidth compared to intra-node channels. To decrease latency and to conserve interconnect bandwidth, NUMA-aware policies may encourage intra-node communication over inter-node communication.

Creating efficient software for NUMA systems may be challenging because such systems may present a naïve, uniform "flat" model of the relationship between processors and memory, hiding the actual underlying topology from the programmer. To create software for these systems, the programmer may need to study architecture manuals and use special system-dependent library functions to exploit the system topology. NUMA-oblivious multithreaded programs may suffer performance problems arising from long access latencies caused by inter-node coherence traffic and from interconnect bandwidth limits. Furthermore, since inter-node interconnect bandwidth is a shared resource, coherence traffic generated by one thread may impede the performance of other unrelated threads because of queuing delays and/or channel contention.

Extracting the best possible performance from NUMA machines may require the re-design of the concurrent algorithms, concurrent data structures, and/or synchronization primitives that form the building blocks of many of today's applications. One of the synchronization primitives traditionally used in parallel programs that may be adapted for use on NUMA machines is a reader-writer lock. Some examples of the adaptation of reader-writer locks for use on NUMA machines are described in "Numa-aware reader-writer locks" by Irina Calciu, Dave Dice, Yossi Lev, Victor Luchangco, Virendra J. Marathe, and Nir Shavit (in Proceedings of the 18th ACM SIGPLAN symposium on Principles and practice of parallel programming, PPoPP '13, pages 157-166, New York, NY, 2013). In various embodiments, the techniques described herein for utilizing a synthetic level in the hierarchical topology of a NUMA-aware reader-writer lock may be applied to these and other reader-writer locks. A basic implementation of a reader-writer lock (e.g., one in which there is a single variable to indicate the synchronization object) may not be scalable on large machines that include multiple processor cores located on multiple processor chips implemented on multiple computing nodes. For example, because threads executing on different ones of the processors access a single variable, a lot of cross-coherence traffic may be generated to access the latest copy of that single variable, which may degrade performance significantly. In some embodiments, more complex reader-writer locks may be distributed in nature. For example, instead of having only one single variable, the synchronization object may be made up of multiple variables, and a thread may choose which variable to access or modify in order to acquire the lock. This distributed approach may reduce the cross-coherence traffic if the variable is chosen wisely. The number of individual variables employed in such systems may be chosen based on the number of processor chips, the number of processor cores, and/or the number of computing nodes in the system, in different embodiments.

In some embodiments, the reader-writer lock algorithms described herein may provide better performance in NUMA architectures than standard implementations of reader-writer locks, as they may take into account the effects of NUMA architectures on reader-writer locks. In other words, by modifying reader-writer locks for better scaling on NUMA machines, as described herein, the performance of multi-threaded applications on such architectures may be further improved. Variations of these locks, several of which are described herein, may trade fairness between readers and writers for higher concurrency among readers and better back-to-back batching of writers from the same NUMA node. In various embodiments, these reader-writer locks may leverage a lock cohorting technique to manage synchronization between writer threads in a NUMA-friendly fashion (e.g., to band together the writer requests coming from a single NUMA node), may employ binary flags to coordinate readers and writers, and/or may employ distributed reader counters to enable NUMA-friendly concurrency among readers.

As noted above, a reader-writer lock may relax the central property of traditional mutual exclusion (mutex) locks by allowing multiple threads to hold the lock simultaneously in read-only mode. A thread may also acquire the lock in write mode for exclusive access. Reader-writer locks are used in a wide range of settings including operating system kernels, databases, high-end scientific computing applications and software transactional memory implementations. Existing algorithms for implementing reader-writer locks may include simple counter- or semaphore-based solutions, solutions leveraging centralized wait-queues, or solutions that use more sophisticated data structures such as Scalable Non-Zero Indicators (SNZI objects). Many of these previous approaches (other than the SNZI-based solutions) may rely on centralized structures to coordinate threads, and may thus encounter scalability impediments. In some embodiments, the SNZI-based algorithms may keep track of reader threads (threads acquiring the reader-writer lock in read-only mode) with each reader thread arriving at a leaf in a "SNZI tree". In some embodiments, readers may be made NUMA-aware by partitioning the leaves of the SNZI-tree among NUMA nodes, with threads arriving at SNZI leaves associated with their node. Writers, however, may remain NUMA-oblivious, which can impair scalability.

In another "distributed" approach to building scalable reader-writer locks, each distributed reader-writer lock may contain N reader-writer locks where N may be equal to the number of processors in the system. In this approach, each reader thread is mapped to a single reader-writer lock, and must acquire that lock in read-only mode in order to execute its critical section. A writer thread must acquire all of the underlying reader-writer locks in write mode to execute its critical section. Deadlocks between writers are avoided by forcing a specific locking order. In some embodiments, this approach may be made NUMA-aware by restricting N to the number of NUMA nodes in the system, and mapping each reader to the lock dedicated to its node. This variant algorithm may be considered to be partially NUMA-aware, just like the SNZI-based reader-writer locks. In this variant, absent any writer threads, reader threads on different nodes may obtain and release read permission without generating any inter-node write coherence traffic. However, every writer thread may incur the overhead of acquiring write permission for the reader-writer lock of every node, potentially generating significant coherence traffic. Thus, the performance of this variant may plummet with increased writer activity. In addition, because of the canonical locking order used to avoid deadlock, reader threads on nodes that appear late in the order may enjoy an unfair performance advantage over reader threads running on nodes that appear earlier.

In various embodiments, the reader-writer locks described herein may be designed to leverage NUMA features and deliver better performance and scalability than prior reader-writer lock algorithms. In some embodiments, a distributed structure may be maintained for reader metadata such that reader threads denote their intent to acquire the reader-writer lock in read-only mode by updating only locations associated with their nodes (e.g., node-local read indicator structures or node-local reader counters). By localizing updates to read indicators coherence traffic may be reduced on the interconnect.

As noted above, in some embodiments, the NUMA-aware reader-writer lock algorithms described herein may employ a lock cohorting technique. In such embodiments, writer threads may use a cohort lock to synchronize with each other and to maintain writer-vs.-writer exclusion. For example, using the cohort locking approach, a writer releasing the lock may preferentially hand off access permission to a pending local writer thread (e.g., a blocked writer thread executing on the same node), if there is one. This may enhance reference locality in the node's cache for both the lock metadata and the data accessed in the critical section it protects, reducing lock migrations between nodes. As used here herein, the term "lock migration" may refer to a situation in which the lock is consecutively acquired by threads residing on distinct NUMA nodes. On a cache-coherent NUMA system, lock migration leads to the transfer of cache lines (both for lines underlying the lock metadata as well as for lines underlying mutable data accessed in the critical section protected by the lock) from the cache associated with the first thread to that of the second thread. In some embodiments, the NUMA-aware reader-writer lock algorithms described herein may maintain tight execution paths for both reader threads and writer threads, which may reduce latency of the lock acquisition and/or lock release operations.

In some embodiments, the NUMA-aware reader-writer locks described herein may include distributed implementations of a read indicator, e.g., a data structure that tracks the existence of reader threads using per-node read indictor elements. For example, in some embodiments, reader threads may "arrive" at node-local reader counters during lock acquisition and may "depart" from them during lock release. Writer threads may query the read indicator (or its reader counters) to detect concurrently active readers. Because of the distributed nature of the read indicator, the reader threads may need only access the node-specific metadata of the lock. In some embodiments, the NUMA-aware reader-writer locks may use binary flags and checks for coordination between reader threads and writer threads. Together, these mechanisms may be used to implement a family of lock algorithms that push the performance envelope of reader-writer locks on NUMA systems far beyond that of prior reader-writer lock algorithms.

Various NUMA-aware reader-writer locks in this family may be differentiated from each other based (at least in part) on the fairness properties they provide. In particular, these locks may exhibit different "preference" policies, e.g., a reader-preference policy, a writer-preference policy, and a neutral-preference policy. A reader-preference policy may dictate that reader threads should acquire (i.e., be granted) the NUMA-aware reader-writer lock as early as possible, regardless of their arrival order, whereas a writer-preference policy may have a symmetric bias towards writer threads. More specifically, these preference policies may allow reader threads or writer threads to "bypass" prior pending writer threads or reader threads (respectively) in the race to acquire the lock. These preference policies (other than the neutral policy) may lead to starvation of threads engaged in the non-preferred lock acquisition operation. However, in some embodiments, such starvation may be avoided by allowing the lock mechanism to temporarily override the preference policy so as to allow forward progress of starving threads. In other words, starving threads may become "impatient" and transiently change the preference policy.

Lock Design

NUMA-aware mutex lock designs are primarily directed to the reduction of the lock migration frequency so as to generate better node-local locality of reference for the lock and the critical section it protects. NUMA-aware mutex locks may act to reduce the rate of write invalidations and coherence misses satisfied by cache-to-cache transfers from remote caches via the interconnect. In some embodiments, the NUMA-aware reader-writer lock designs described herein may additionally address the complementary goal of maximizing reader-reader concurrency.

Note that there may be an interesting tension between these two goals. For example, promoting concurrent reader-reader sharing across NUMA nodes may tend to lead to designs that "spread" the lock metadata and critical section data across these nodes, whereas reducing the lock migration rate may tend to significantly curtail this spread. However, this apparent contradiction between these goals may be effectively reconciled by using a policy that attempts to reduce lock migrations only between writers, while at the same time maximizing concurrency between readers. In order for this strategy to be most effective, the algorithms described herein may aggressively "batch" the concurrent writer locking requests coming from a single NUMA node and may maintain a high local writer-to-writer lock hand off rate. Note that this aggressive writer batching approach may complements the goal of maximizing reader-reader concurrency because the latter may benefit significantly by aggressively aggregating (co-scheduling) reader locking requests. The potential benefits of these design goals may be further illustrated in various examples described herein.

FIG. 1 is a block diagram illustrating portion of a computer system that implements a NUMA style memory architecture, according to one embodiment. For example, the computer system illustrated in FIG. 1 includes multiple CPU boards 100 (shown as 100a-100n) that communicate with each other over interconnect 150. In this example, each of the CPU boards (which include a shared board-local memory 125) may be considered a node in the NUMA system, while in other embodiments, each node of a NUMA system may be a socket or die that includes multiple processor cores that share memory. One of these CPU boards (100a) is illustrated in more detail than the others. In some embodiments, each of the CPU boards 100 may include the same or a similar architecture as that illustrated for CPU board 100a. In other embodiments, each of the CPU boards may include a different number and/or arrangement of processor cores, caches, etc. As illustrated in FIG. 1, the computer system may also include one or more system memories 160 and/or other components 170. In this example, CPU board 100a includes two processor chips (shown as processor chips 110a and 110b) that communicate with each other and with shared memory 125 over interconnect 140. In this example, processor chips 110a and 110b include a similar architecture.

In the example illustrated in FIG. 1, processor chip 110a includes four processor cores (shown as 120a-120d), and each processor core has a respective (dedicated) level 1 (L1) cache (shown as 130a-130d). Similarly, processor chip 110b includes four processor cores (shown as 120e-120h), and each processor core has a respective (dedicated) level 1 (L1) cache (shown as 130e-130h). Each processor core may be a multi-threaded core, in some embodiments. For example, in one embodiment each processor core may be capable of concurrently executing eight hardware threads.

Inter-thread communication via local caches (e.g., L1 and L2 caches) may be significantly faster than inter-thread communication via remote caches because the latter involves cache coherence messages that are communicated across one or more of the interconnects 140 and 150. For example, the threads executing on a given processor core 120 may share the level 1 cache 130 for that processor core 120, and accesses to this level 1 cache, which may be considered local to the processor core 120 and its hardware threads, may be extremely fast. In addition, the four processor cores 120 of processor chip 110a may share the level 2 (L2) cache 135a for processor chip 110a, and accesses to this level 2 cache (by the four processor cores of processor chip 110a) may also be fast, although not as fast as those to each processor core's own level 1 cache. Similarly, the four processor cores 120 of processor chip 110b may share the level 2 (L2) cache 135b for processor chip 110b, and accesses to this level 2 cache (by the four processor cores of processor chip 110b) may also be fast, although not as fast as those to each processor core's own level 1 cache.

In this example, accesses to caches of a different processor chip 110 on the same CPU board 100, to caches of a processor chip 110 on a different CPU board 100, to a board-local shared memory 125 on a different CPU board 100, and/or to various system memories 160 (all of which may be considered remote accesses with respect to a hardware thread executing a particular processor core 120 of a processor chip on CPU board 100a) may exhibit increasingly higher latency, when compared to accesses to the level 1 and level 2 caches that are local to that hardware thread.

In some embodiments, threads executing in a NUMA system may execute critical sections that are protected by a reader-write lock and/or access shared resources that are protected by a reader-write lock. In one example (e.g., in the NUMA system illustrated in FIG. 1), six threads (referred to as threads r1-r6) may attempt to acquire a reader-writer lock L in read-only mode in order to execute a critical section, and six threads (referred to as threads w1-w6) may attempt to acquire the same lock L in write mode in order to execute a critical section. In this example, it is assumed that the critical sections protected by the lock L access the same shared data.

Figure 2A:
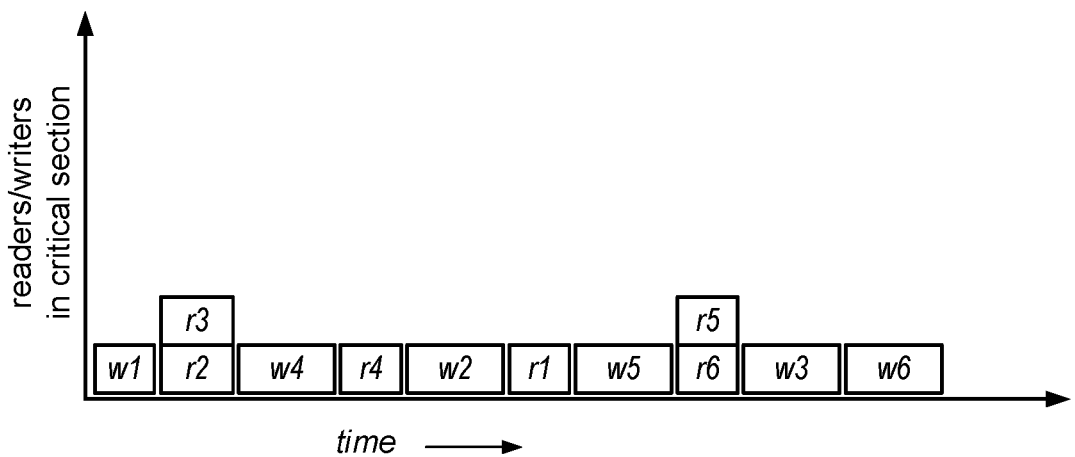
FIGS. 2A-2C illustrate different critical section execution scenarios for a variety of locking schedules, according to one embodiment.
Figure 2B:
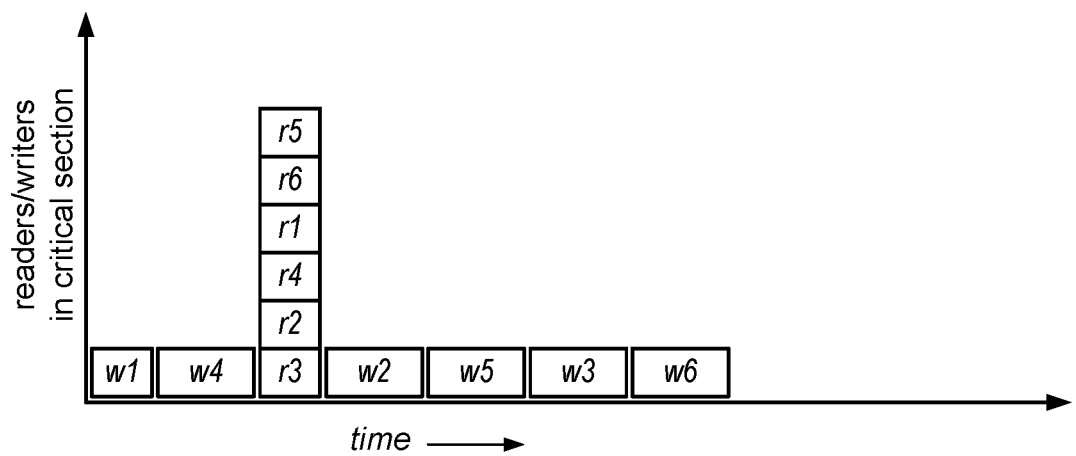
Figure 2C:
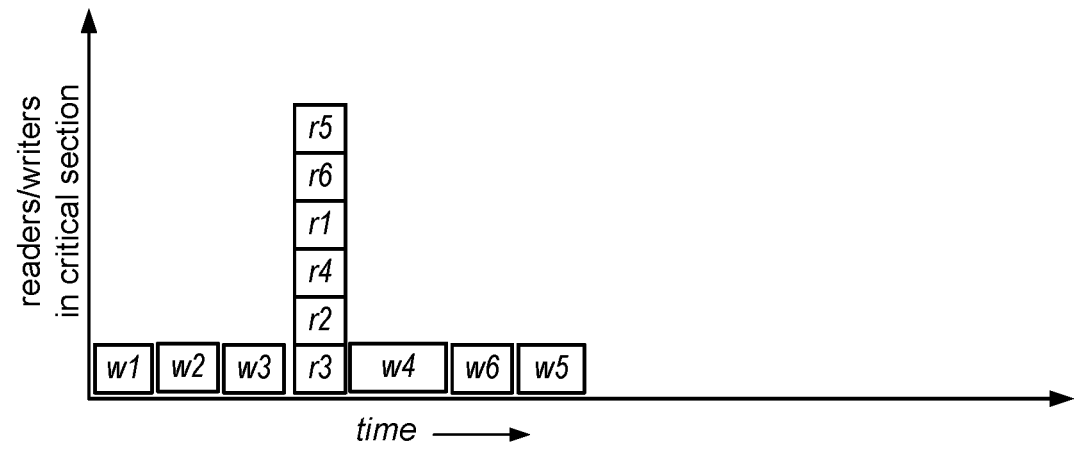

In various embodiments, the order in which the reader-writer lock is granted to concurrently executing threads may be dependent on the processor cores on which they are executing, on whether they are attempting to acquire the lock in read-only mode or in write mode, on the other threads that are also executing in the system, on the type of reader-writer lock they are attempting to acquire, on the scheduling policies employed in the particular NUMA system (or for the particular lock), and/or on the priority scheme implemented in the system (or for the lock). FIGS. 2A-2C illustrate various critical section execution schedules that may be possible for these readers and writers when the critical section is protected by different types of reader-writer locks (e.g., reader-writer locks with different scheduling or priority policies). In these examples, threads w1 and w2 are executing on processor core 120a; thread r3 is executing on processor core 120b; thread r2 is executing on processor core 120c; threads r1 and w3 are executing on processor core 120d; threads w4 and w5 are executing on processor core 120e; threads w6 and r5 are executing on processor core 120f; and threads r4 and r6 are executing on processor core 120g. In this example, no threads are currently executing on processor core 120h.

FIG. 2A illustrates a possible critical section execution schedule arbitrated by a naïve reader-writer lock that does not aggressively aggregate readers or provide back-to-back consecutive batching of writers from a given NUMA node, according to one embodiment. In this example, writer thread w1 (executing on processor core 120*a*) is scheduled for execution first, followed by reader threads r2 and r3 (which execute concurrently on processor cores 120*c* and 120*b*, respectively), writer thread w4 (executing on processor core 120*e*), reader thread r4 (executing on processor core 120*g*), writer thread w2 (executing on processor core 102*a*), reader thread r1 (executing on processor core 120*d*), writer thread w5 (executing on processor core 120*e*), reader threads r5 and r6 (which execute concurrently on processor cores 120*f* and 120*g*, respectively), writer thread w3 (executing on processor core 120*d*), and finally writer thread w6 (executing on processor core 1200. With this scheduling policy, the lock does not provide good reader-reader concurrency, and hence it takes more time to execute all the critical sections. Note that, in various embodiments, assuming a backlog of pending readers, higher rates of alternation between read and write modes may yield lower levels of reader-reader concurrency.

FIG. 2B illustrates a scheduling policy that yields improved reader-reader concurrency over the example illustrated in FIG. 2A through aggressive reader batching. In some embodiments, by aggressively aggregating read requests, the lock may successfully co-schedule a large group of readers, allowing them to execute the critical section concurrently (e.g., substantially in parallel). In this example, writer thread w1 (executing on processor core 120*a*) is scheduled for execution first, followed by writer thread w4 (executing on processor core 120*e*), reader threads r1-r6 (all of which execute concurrently on respective processor cores), writer thread w2 (executing on processor core 120*a*), writer thread w5 (executing on processor core 120*e*), writer thread w3 (executing on processor core 120*d*), and finally writer thread w6 (executing on processor core 1200. In this example, the scheduling of executing writers alternates between the two NUMA nodes illustrated FIG. 1. In some embodiments, this may lead to significant coherence traffic that slows down the writers. Note that, in these examples, the relative widths of the boxes in FIGS. 2A-2C may indicate the relative time taken to complete each of the critical section invocations, with broader boxes reflecting the overhead associated with inter-node communication latencies.

FIG. 2C illustrates a scheduling policy that addresses this issue through aggressive batching of both reader and writers. More specifically, a system that employs the scheduling policy illustrated in FIG. 2C may, in some embodiments, batch together writers from the same NUMA node for execution in a consecutive back-to-back fashion. In this example, writer thread w1 (executing on processor core 120*a*) is scheduled for execution first, followed by writer thread w2 (also executing on processor core 120*a*), writer thread w3 (executing on processor core 120*d*), reader threads r1-r6 (all of which execute concurrently on respective processor cores), writer thread w4 (executing on processor core 120*e*), writer thread w6 (executing on processor core 1200, and finally writer thread w5 (executing on processor core 120*e*).

As illustrated in this example, by applying a scheduling policy that implements aggressive batching of both reader and writers, some writer threads (e.g., writer threads w2, w3, w5, and w6) may incur fewer coherence misses during the execution of their critical sections than the number of coherence misses incurred during the execution of a critical section by other writer threads (e.g., writer thread w4). As noted above, this is indicated by the relative widths of the boxes in FIG. 2C. In various embodiments, the savings realized in taking this approach may translate to significant performance gains for reader-writer locks.

Reader-Writer Lock Algorithms

In the example NUMA-aware reader-writer lock designs described herein, each of the reader-writer lock instances includes a single central cohort mutual exclusion lock that is used to synchronize writers. In other words, writer-vs.-writer conflicts are resolved via the central cohort lock. In these examples, writer threads must acquire this cohort lock in order to gain exclusive write ownership of the reader-writer lock. Before executing the critical section, the writer thread that owns the cohort lock must also reconcile reader-vs.-writer conflicts by ensuring that there are no concurrent readers executing or about to execute their respective critical sections. In these examples, the readers portion of these reader-writer locks uses distributed read indicators (ReadIndr in the pseudo-code below). More specifically, ReadIndr is implemented as a distributed counter, with a reader counter per NUMA node. In these examples, to acquire a reader-writer lock in read-only mode, a reader thread must arrive at the lock's ReadIndr. Each reader thread increments its node-local reader counter during arrival and decrements the node-local reader counter during depart. In these examples, while writer threads update the central lock, they only query (but do not update) the distributed read indicators.

Cohort Locks

Lock cohorting is a technique used to compose NUMA-aware mutex locks from NUMA-oblivious mutex locks. Cohort locks may be hierarchical in structure, with one top-level lock and multiple locks at the second level, e.g., one for each node in a NUMA system. A cohort lock is said to be owned by a thread when that thread owns the top-level lock. In various embodiments, lock cohorting leverages the following two properties: (i) cohort detection, whereby a lock owner can determine whether there are additional threads waiting to acquire the lock; and (ii) thread-obliviousness, whereby the lock can be acquired by one thread and released by any other thread. More specifically, the top-level lock may be thread-oblivious and the second-level locks may have the property of cohort detection. In some embodiments, a hierarchical approach may be taken in building a NUMA-aware reader-writer lock. For example, in some embodiments, threads may contend on local structures (e.g., node-level or cluster-specific locks) to get permission to acquire a top-level (globally shared) reader-writer lock. In some such embodiments, writer threads may follow the lock cohorting strategy of handing off the lock to a local thread (i.e., one executing on the same NUMA node or in the same cluster of processor cores), whereas reader threads may follow an "all readers get in" strategy (in which all reader threads from all NUMA nodes can simultaneously acquire the lock in read-only mode). In other embodiments, only reader threads executing on a single NUMA node can simultaneously acquire the lock in read-only mode.

In some embodiments, to acquire the cohort lock, a thread must first acquire ownership of the lock assigned to its node and then acquire ownership of the top-level lock. After executing its critical section, the cohort lock owner may use the cohort detection property of its local node-level lock to determine whether there are any local successors, and may hand off ownership of the local lock to a successor, if one exists. With this local lock hand off, the owner may also implicitly pass ownership of the top-level lock to that same successor. If the lock owner determines that there are no local successors then it may release the top-level lock. In some embodiments, the thread-obliviousness property of the top-level lock may come into play at this point. For example, ownership of the lock may initially be acquired by one thread executing on a given node, then implicitly circulated among several threads executing on that same node, and eventually released by some (possibly different) thread executing on that same node. To avoid starvation and provide long-term fairness, cohort lock implementations may place a bound on the number of back-to-back local lock transfers. For example, in some embodiments, an upper bound on the number of back-to-back local lock transfers may be set at 64, or at some other pre-determined (or configurable) value. In some embodiments, the cohort lock algorithm described herein may intentionally trade strict short-term FIFO/FCFS fairness for improved aggregate throughput. Specifically, some amount of unfairness (in which admission order deviates from arrival order) may be leveraged in order to reduce lock migrations and improve aggregate throughput of a set of contending threads. Unfairness, applied judiciously, and leveraged appropriately, may result in reduced coherence traffic and improved cache residency.

One goal of cohort locks is to reduce interconnect coherence traffic and coherence misses. In turn, the hit rate in the local cache may improve. In designing the example lock algorithms described herein, it was assumed that critical section invocations under the same lock are likely to exhibit reference similarity. In other words, it was assumed that acquiring a lock L may be a good predictor that the critical section protected by lock L will access data that was accessed by recent prior critical sections protected by lock L. Therefore, after a local hand off, data to be written by the next lock owner may be likely to be found in the owner's local cache, already in modified coherence state, as it may have been written by the prior lock owner. As such, the critical section may execute faster than if the prior owner resided on a different node. Cohort locks may provide benefit by reducing coherence traffic on both lock metadata and data protected by the locks. For example, if a cache line to be read is in modified state in some remote cache then it must currently be invalid or not present in the local cache. In that case, the cache line must be transferred to the local cache from the remote cache via the interconnect and downgraded to shared state in the remote cache. Similarly, if a cache line to be written is not already in modified state in the local cache, all remote copies of the cache line must be invalidated, and, if the line is not in shared state, the contents must be transferred to the cache of the writer thread. Note that read-read is the only form of sharing that does not require coherence communication. The locking techniques described herein are not as concerned with classic NUMA issues (such as the placement of memory relative to the location of threads that will access that memory) than with which caches shared data might reside in, and in what coherence states. In various embodiments of the locks described herein, cohort locking may work to reduce write invalidation and coherence misses satisfied from remote caches and may not specifically address remote capacity, conflict, and cold misses, which are also satisfied by transfers over the interconnect.

Note that a cohort locking transformation may be applied to many, if not most, types of existing locks, in different embodiments. A variety of approaches may also be taken for implementing the local structures of a NUMA-aware reader-writer lock, in different embodiments. For example, in various embodiments, local (e.g., node-specific) locks may include a spin-type lock, a ticket-based lock, a queue-based lock, a test-and-test-and-set lock, a back-off lock, or, in general, any other type of blocking or non-blocking lock, including a reader-writer lock. The choice of which approach will perform better for a given multithreaded application may be dependent on various characteristics of the system and/or the application (e.g., its aggregate workload and/or the distribution of accesses by the threads to a critical section(s) of code or shared resource(s) that are protected by the lock).

In some embodiments, the reader-writer locks described herein may include a cohort lock that uses classic ticket locks for the NUMA node-level locks and a partitioned ticket lock for the top-level lock. In such embodiments, an "isLocked" interface (API) may allow reader threads to determine whether the write lock is held. This function may be implemented by comparing the request and grant indices of the top-level partitioned ticket lock. This lock may be competitive with other cohort locks, and may avoid the node management overhead inherent in classic queue-based locks, but may still provide local spinning. In some embodiments, the top-level and node-level locks implement FIFO ordering, although the resultant lock may not necessarily implement FIFO ordering.

A Neutral-Preference Lock

In one embodiment of a neutral-preference NUMA-aware reader-writer lock, referred to herein as a C-RW-NP lock (Cohort; Read-Write; Neutral-Preference), the lock may attempt to ensure fairness between reader threads and writer threads (meaning that the reader threads or writer threads do not get any preferential treatment over the writer threads or reader threads, respectively). In this example, all threads (including reader threads and writer threads) may be "funneled" through a central cohort lock, such as that described above. The example high-level pseudo-code below depicts one embodiment of a C-RW-NP lock. In this example, each thread must first acquire the central CohortLock. For example, a reader thread uses the central lock to obtain permission to arrive at ReadIndr, then immediately releases the lock, and proceeds to execute its critical section. The fact that reader threads execute their critical sections after releasing CohortLock may enable the potential for reader-reader concurrency.

After acquiring the cohort lock, a writer thread must ensure that there are no concurrent conflicting readers. As illustrated in this example, this may be done by spinning on ReadIndr (as shown on lines 9-10) waiting for any reader threads to depart. In some embodiments, this algorithm may ensure neutral preference since both the reader threads and the writer threads have to acquire the cohort lock. However, requiring reader threads to acquire the cohort lock may be detrimental to the scalability of C-RW-NP, and may also increase the latency of each read acquisition request. In some embodiments, the C-RW-NP lock may preserve some cache locality benefits for accesses to the lock metadata and the critical section protected by the lock because all operations funnel through the central cohort lock. Note that the C-RW-NP lock may not guarantee FIFO semantics. Rather, admission ordering may be determined by the prevailing policy imposed by the underlying CohortLock.

The pseudo-code below illustrates one example of a neutral-preference NUMA-aware reader-writer lock (C-RW-NP). In this example, lines 1-5 are executed by a reader thread and lines 8-12 are executed by a writer thread. For simplicity, the pseudo-code lists the entirety of lock acquisition, critical section execution, and lock release operations in sequential order. In their lock acquisition steps, both reader threads and writer threads acquire the cohort lock, while readers also arrive at the ReadIndr. In some embodiments, ReadIndr arrival and departure operations may be atomic operations.

```
1: reader:
2: CohortLock.acquire( )
3: ReadIndr.arrive( )
4: CohortLock.release( )
<read-critical-section>
6: ReadIndr.depart( )
7: writer:
8: CohortLock.acquire( )
9: while NOT(ReadIndr.isEmpty( ))
10: Pause
11: <write-critical-section>
12: CohortLock.release( )
```

As previously noted, one benefit of reader-writer locks is that they may facilitate parallelism between multiple concurrent readers. However, the performance of an application that employs reader-writer locks may be poor when lock ownership merely alternates between reader threads and writer threads (e.g., with one read, then one write, then one read, then one write, and so on). In that case, the application may not experience any parallelism with those reader threads. The performance may be much improved if, e.g., three readers are allowed to acquire the reader-writer lock, then a writer, then a few more readers, and then another writer (or two), and so on.

As noted above, reader-writer locks may achieve improved concurrency when large "R-groups" (groups of readers that can execute concurrently with each other) are encouraged to form. Relatedly, reducing the rate of alternation between read mode and write mode may promote larger R-groups. A cohort reader-writer lock that implements a writer-preference attempts to chain sequences of pending write operations together. This may, in turn, allow large groups of readers to accumulate, subsequently yielding larger R-groups and improved throughput. The admission policies in this type of reader-writer lock typically use a number of empirically derived tunable parameters and heuristics to actively promote R-group formation (e.g., a "patience" parameter). With this type of lock, readers normally defer to writers. However, with this type of lock, there can be starvation problems, depending on how the parameters are tuned. Therefore, reliance on such parameters may be undesirable. For example, if too many readers are let in, the writers might not get a chance to acquire the reader-writer lock. Conversely, if writers are treated too preferentially, reader threads might not be able to acquire the reader-writer lock. In some cases (e.g., if readers starve too long and their patience is exhausted), they may erect a barrier that blocks incoming writers, ensuring eventual progress for readers.

In some embodiments, the techniques described herein for promoting reader group formation may be applied to a cohort reader-writer lock that employs a neutral preference policy. A cohort reader-writer lock that implements this policy may include a central cohort lock (e.g., a central mutex) that all threads (including readers) acquire at least once (e.g., to resolve reader vs. writer conflicts). For example, in some embodiments, when a reader wants to execute a critical section or access a shared resource that is protected by a cohort reader-writer neutral-preference lock, it may briefly acquire the central lock, increment a reader count associated with the lock, and then drop the central lock. In such embodiments, reader threads may only hold the central lock for a very small amount of time, while writer threads may hold the central mutex for the entire time during which they are performing a write operation under the lock. Such standard C-RW-NP locks, which do not employ the tunable parameters of a writer-preference lock, have been shown to work well in many applications (e.g., since as cohort mutexes are relatively efficient). However, they may provide reduce performance when compared to cohort reader-writer locks that implement a writer-preference policy (due, e.g., to the unnecessary serialization induced by the requirement for readers to acquire the lock). Note that the C-RW-NP lock itself does not actively put readers together (i.e., it does not actively promote the formation of r-groups). In other words, any reader-reader parallelism achieved with this neutral preference lock may be due to happenstance (e.g., arising from their arrival order), rather than any deliberate action on the part of the lock implementation itself.

As noted above, the techniques described herein for promoting reader group formation may be applied to cohort reader-writer locks that employ a neutral preference policy. These locks may be relatively simple compared to some other forms of cohort reader-writer locks, and may include fewer system-dependent or load-dependent tunable parameters, making them generally more robust under varying circumstances. The application of these techniques may, in some embodiments, allow a C-RW-NP lock to provide better performance than a C-RW-WP lock. With this approach, as with other C-RW-NP locks, all threads, even readers, pass through the central cohort writer lock in order to resolve conflicts and gain permission to enter their respective critical sections.

In some embodiments, in order to promote reader group formation, a new synthetic layer may be inserted into the hierarchical lock topology, creating a 3-level hierarchy, for example. For example, a typical cohort mutex lock may include only two layers or levels (e.g., a top-level lock and multiple node-level locks). However, under the approach described herein, the cohort reader-writer lock may include three (or more) layers/levels. For example, in one embodiment, the lowest level in the lock hierarchy may include node-level reader locks (e.g., locks R0-R3, in a three-node system) and node-level writer locks (e.g., locks W0-W3, in a three-node system). The next level in the lock hierarchy may be a synthetic level that includes, e.g., one reader lock (R) and one writer lock (W). Finally, the lock hierarchy may include a top-level lock such as those included in a typical cohort reader-writer lock. In some embodiments, the addition of the synthetic level in the lock hierarchy may allow the application developer to exert specific (e.g., independent) control over the readers vs. the writers. In some such embodiments, threads trying to obtain write permission may arrive at their corresponding Wx element and work up through lock W (on the synthetic level) before obtaining the top-level lock, T. Similarly, threads trying obtain read permission may arrive at the appropriate Rx element and work upward to lock R (on the synthetic level) and then finally to lock T. The resultant lock may be referred to herein as a "cohort-s" lock, where "s" indicates the presence of a synthetic layer in the lock hierarchy (e.g., a layer that does not correspond to and/or is not dependent on the topology of the nodes in the system).

In general, cohort locks act to reduce "lock migration" by preferentially passing the lock to waiting threads that are on the same NUMA node as the current owner. To ensure long-term fairness and progress, cohort locks limit the number of consecutive local hand-offs to a bound "B". Note that this bound, B may be the only tunable parameter for a standard cohort lock implementation. In some embodiments, when the cohort-s approach is employed as the central writer lock for C-RW-NP locks, the intermediate layer may act to promote and form larger R-groups. In general, cohort locks reduce lock migration. In some embodiments, by reducing migration between the R and W pseudo-nodes in the lock hierarchy, larger R-groups may be formed, and the lock may enjoy improved throughput over a C-RW-NP reader-writer lock that does not employ cohort-s as the central writer lock.

Figure 3:
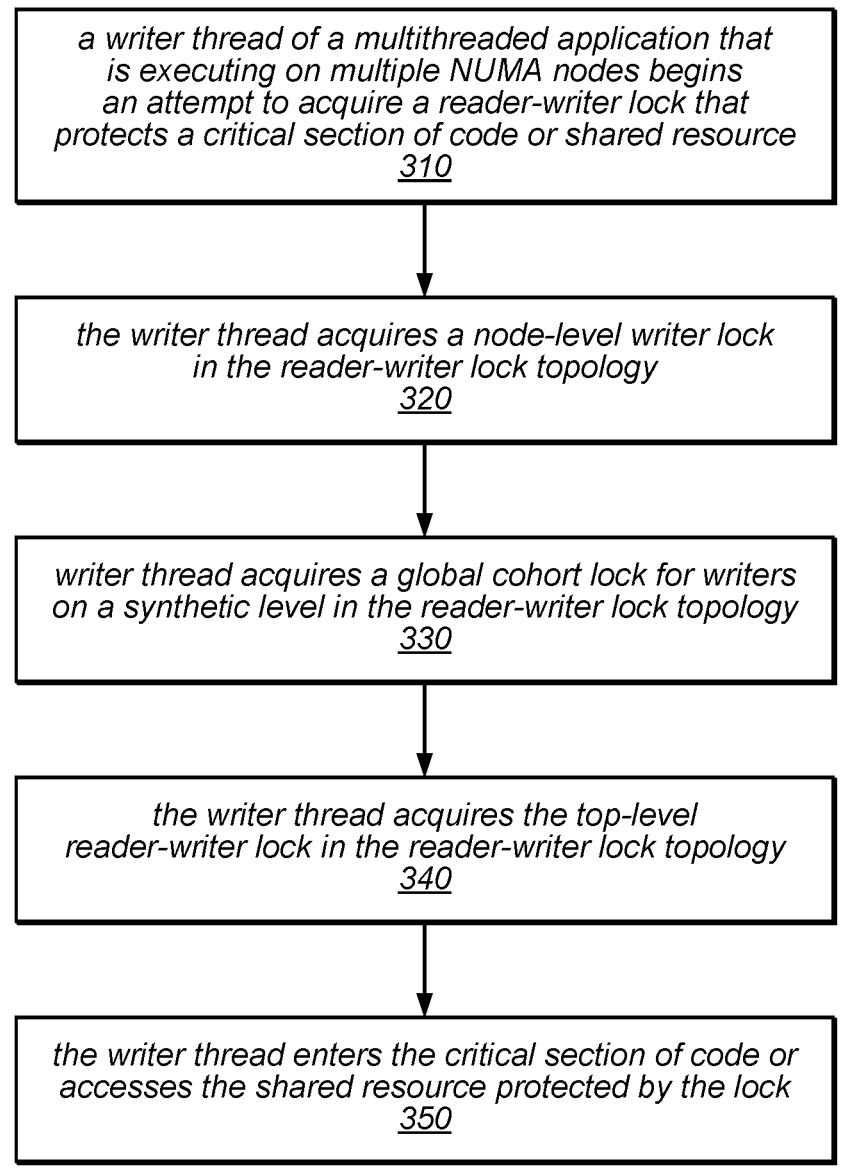
FIG. 3 is a flow diagram illustrating one embodiment of a method for utilizing a synthetic level in the topology of a NUMA-aware reader-writer lock, as described herein.

One embodiment of a method for utilizing a synthetic level in the topology of a NUMA-aware reader-writer lock is illustrated by the flow diagram in FIG. 3. As illustrated at 310, in this example, the method may include a writer thread of a multithreaded application that is executing on multiple NUMA nodes beginning an attempt to acquire a reader-writer lock that protects a critical section of code or shared resource. The method may include the writer thread acquiring its local node-level writer lock in the reader-writer lock's hierarchical topology (as in 320). Note that the method of acquisition may be different in different embodiments, and may be dependent on the lock type of the local node-level writer lock.

As illustrated in this example, the method may include the writer thread acquiring a global cohort lock for writers on a synthetic level in the reader-writer lock hierarchical topology (as in 330). Here again, the method of acquisition may be different in different embodiments, and may be dependent on the lock type of the global cohort lock for writers. The method may also include the writer thread acquiring the top-level reader-writer lock in the reader-writer lock's hierarchical topology (as in 340). In some embodiments, this top-level reader-writer lock may be a cohort-s lock whose implementation allows a developer to specify a policy (e.g., to set various bounds) in order to balance the lock migration between readers and writers. Once the writer thread has acquired the top-level reader-writer lock, the method may include the writer thread entering the critical section of code or accessing the shared resource protected by the lock, as in 350. Note, however, that in some embodiments, the writer might have to wait for one or more readers that are currently accessing the protected critical section or shared resource in read-only mode to drain before entering the critical section of code or accessing the shared resource protected by the lock (e.g., depending on the lock type of the top-level reader-writer lock).

In a typical cohort lock, the cohort lock topology mirrors the system topology, e.g., there is a one-to-one mapping between the NUMA nodes in the system topology and the nodes in the lock hierarchy. As noted above, in some embodiments of the reader-writer locks described herein (those that employ cohort-s type locks), a synthetic layer may be inserted into the lock hierarchy (e.g., one that does not correspond to and/or is not dependent on the topology of the NUMA nodes in the system). As described above, in some embodiments, these locks may include a top-level lock, and below that, a synthetic layer may be inserted that includes only two nodes: a reader side node and a writer side node. In this example, under the reader side, there may be specific node-level reader locks (one per node in the system topology). Similarly, on the writer side, there may be specific node-level writer locks (one per node in the system topology). This approach may facilitate the application of a mechanism similar to that used to ensure fairness between nodes in the cohort lock, in which an upper bound is placed on the number of times the lock may be handed off to another writer on the same node. However, under the cohort-s approach described herein, one or more bounds may be used to control and balance fairness between readers and writers.

Figure 4:
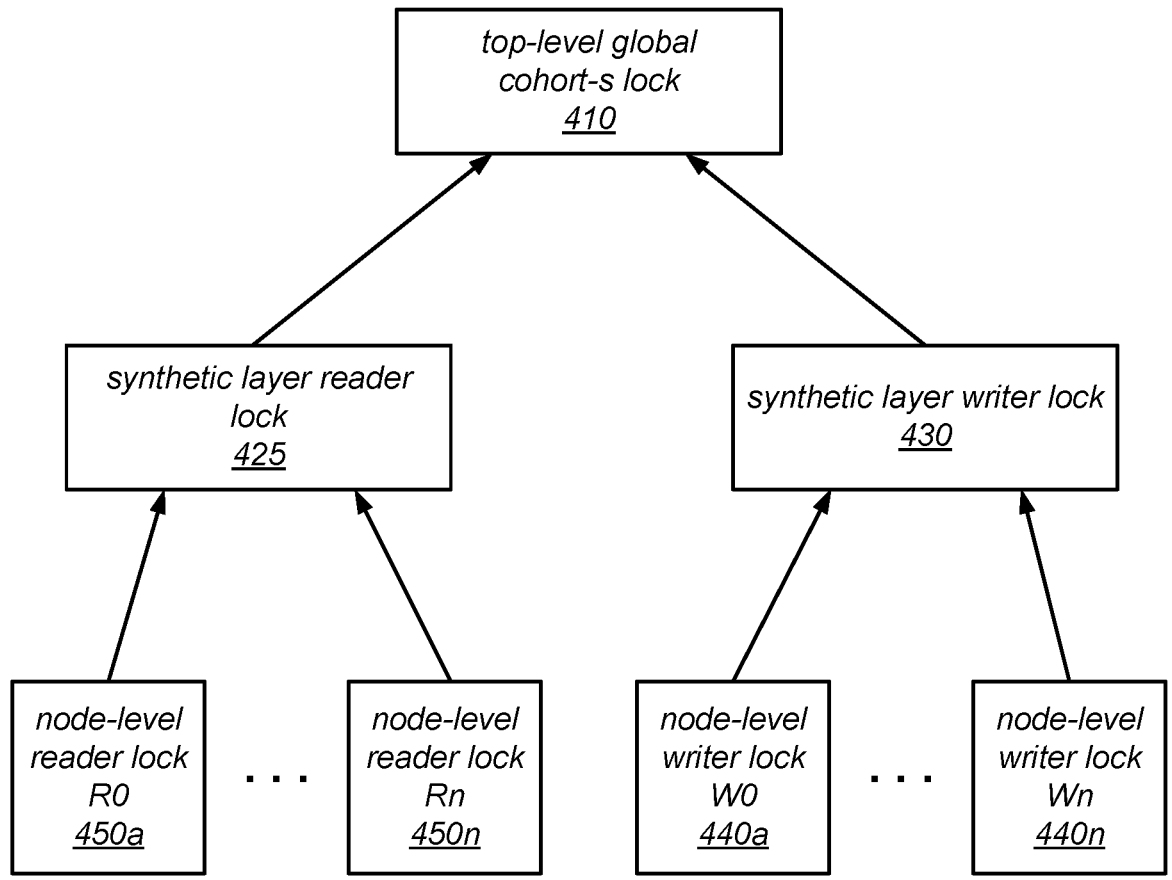
FIG. 4 is a block diagram illustrating an example of a hierarchical lock topology that includes a synthetic level, according to at least some embodiments.

Under a typical approach to lock cohorting, in order to obtain the central cohort lock, a thread may first need to obtain its local node-level lock (e.g., a thread executing on node 3 may obtain lock 3). The thread may then either be given the top-level lock by direct handoff from the previous owner, or may have to arrive at the top-level lock and compete for it. Under the cohort-s approach described herein, as applied to a reader-writer lock, a reader thread executing on node 3 may first attempt to obtain the R3 lock at the lowest level of the lock hierarchy. Once it has obtained the R3 lock, it may move up the lock hierarchy to obtain (or be granted) the synthetic level R lock. Finally, after obtaining the synthetic level R lock, the thread may attempt to obtain the top-level lock. This approach has been shown to promote larger R-groups, leading to more reader parallelism, and thus higher throughput, in some embodiments. As described in more detail below, by applying not only node-based limits on handing off the central lock, but also limits on the number of writers and/or readers that can obtain the central lock in a row, the cohort-s approach described herein may provide a mechanism for explicit control over how aggressively the lock balances readers vs. writers and the fairness policy applied to balance between readers and writers. FIG. 4 is a block diagram illustrating one example of a hierarchical lock topology that includes a synthetic level, according to at least some embodiments. As illustrated in FIG. 4, the lock hierarchy includes a top-level global cohort-s lock 410 (e.g., a top-level lock, T). The lock hierarchy also includes a new intermediate (synthetic) layer that includes R and W pseudo-nodes. These are illustrated in FIG. 4 as synthetic layer reader lock 425 and synthetic layer writer lock 430. Under synthetic layer reader lock 425, there are multiple node-level reader locks R0-Rn (shown as elements 450a-450n). Similarly, under synthetic layer writer lock 430, there are multiple node-level writer locks W0-Wn (shown as elements 440a-440n). In this example, a thread trying to obtain write permission may arrive at the appropriate node-level writer lock (one of elements 440a-440n) and work up through lock W (synthetic layer writer lock 425) before obtaining the top-level global cohort-s lock 410 (T). Similarly, a thread trying obtain read permission may arrive at the appropriate node-level reader lock (one of elements 450a-450n) and work up through lock R (synthetic layer reader lock 425) before obtaining the top-level global cohort-s lock 410 (T).

In some embodiments, a cohort-s type reader-writer lock may include a writer lock (W) at the synthetic level, multiple node-level writer locks (e.g., one per NUMA node), and a single reader lock (which may be considered to be at the synthetic level). In such embodiments, writer threads that wish to acquire the top-level lock may arrive at their respective node-level locks (Wx), while all readers may arrive at the single reader lock (R). In such embodiments, reader threads may hand off to each other (e.g., additional reader threads may be admitted and may briefly hold the top-level lock, prior to allowing a writer thread to obtain the top-level lock), but this handoff may happen without regard to the NUMA node(s) on which the reader thread(s) being handed off to are executing (i.e., the handoff may be agnostic as to the NUMA nodes on which the other reader threads are executing). In such embodiments, as in earlier examples, a writer thread may hand the top-level lock off to a writer thread executing on the same node (if the limit on consecutive writers has not yet been met and if a separately specified bound on consecutive writers on the same node has not yet been met) or may hand off to a writer thread executing on a different node (if the limit on consecutive writers has not yet been met, but a separately specified bound on consecutive writers on the same node has been met). In other words, until an upper bound on the number of consecutive writers has been met, a writer thread may hand the top-level lock off to whichever writer is granted the synthetic level writer lock (W) by hand-off or obtains W by competing for it among waiting writers. As described herein, in this alternate embodiment, the presence of the synthetic layer may facilitate controlling the balance between the number of readers and the number of writers that obtain the top-level lock.

Figure 5:
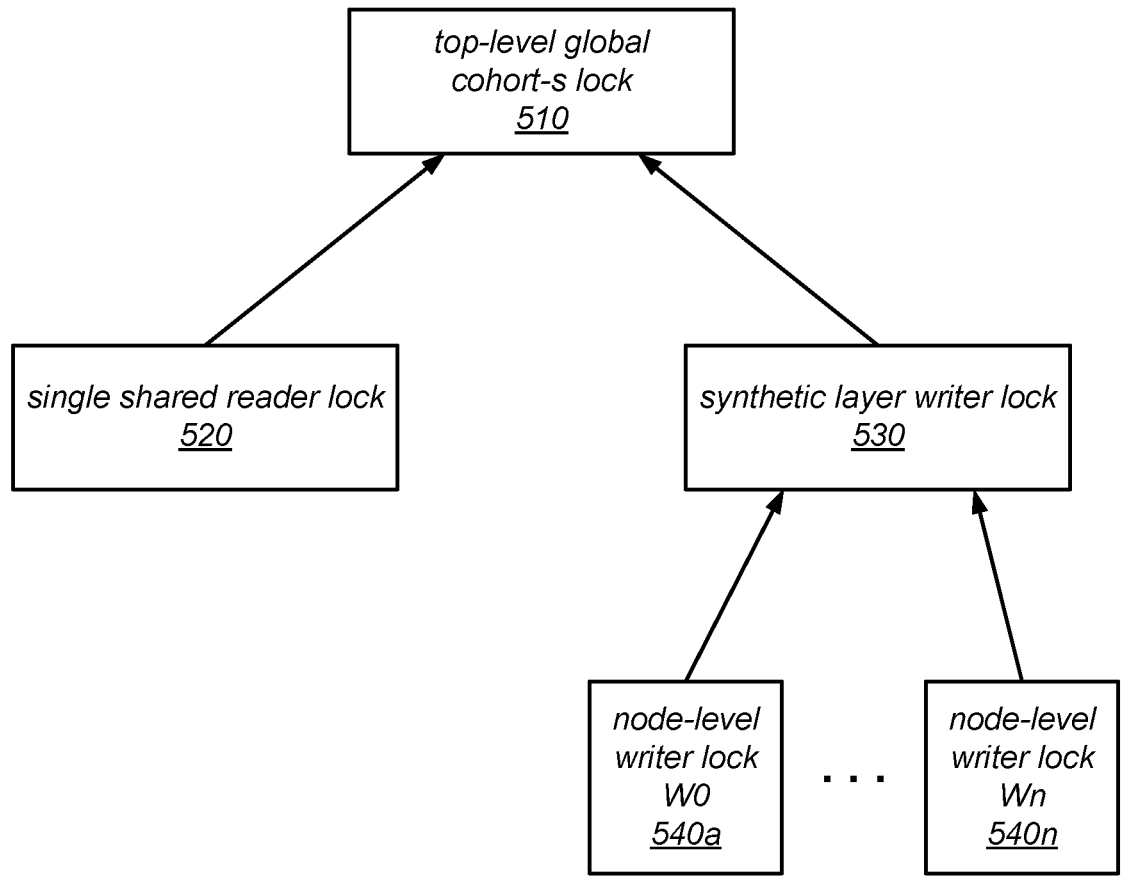
FIG. 5 is a block diagram illustrating another example of a hierarchical lock topology that includes a synthetic level, according to at least some embodiments.

FIG. 5 is a block diagram illustrating another example of a hierarchical lock topology that includes a synthetic level, according to at least some embodiments. As illustrated in FIG. 5, the lock hierarchy includes a top-level global cohort-s lock 510 (e.g., a top-level lock, T). The lock hierarchy also includes an intermediate (synthetic) layer that includes R and W pseudo-nodes. These are illustrated in FIG. 5 as a synthetic layer writer lock 530 and a single shared reader lock 520. Under synthetic layer writer lock 530, there are multiple node-level writer locks W0-Wn (shown as elements 540*a*-540*n*). However, there are no node-level reader locks under the single shared reader lock 520, in this topology. In this example, a thread trying to obtain write permission may arrive at the appropriate node-level writer lock (one of elements 540*a*-540*n*) and work up through lock W (synthetic layer writer lock 530) before obtaining the top-level global cohort-s lock 510 (T). However, a thread trying obtain read permission may arrive at the single shared reader lock R (synthetic layer reader lock 520) before obtaining the top-level global cohort-s lock 510 (T).

Figure 6:
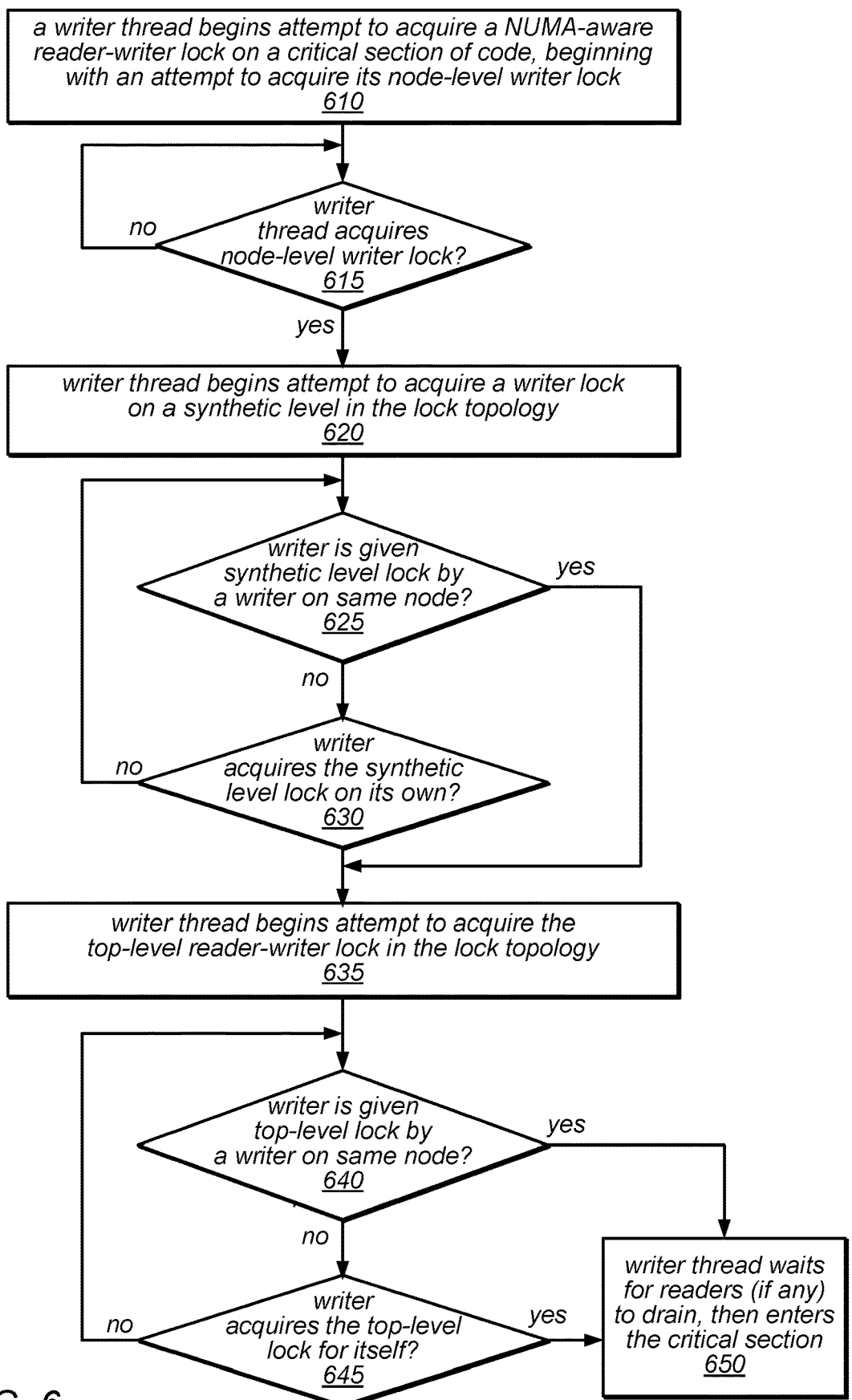
FIG. 6 is a flow diagram illustrating one embodiment of a method for a writer thread to acquire a NUMA-aware reader-writer lock, as described herein.

One embodiment of a method for a writer thread to acquire a NUMA-aware reader-writer lock is illustrated by the flow diagram in FIG. 6. As illustrated at 610, in this example, the method may include a writer thread beginning an attempt to acquire a NUMA-aware reader-writer lock on a critical section of code, which may include the writer thread beginning an attempt to acquire its local node-level writer lock. As illustrated at 615 and by the feedback from the negative exit of 615 to its input, in some embodiments the method may include the writer thread repeatedly attempting to acquire its local node-level writer lock until it is successful. Note that, as in other examples described herein, the method of acquisition may be different in different embodiments, and may be dependent on the lock type of the local node-level writer lock.

As illustrated in FIG. 6 by the positive exit of 615 and element 620, when and if the writer thread acquires its local node-level writer lock, the method may include the writer thread beginning an attempt to acquire a writer lock on a synthetic level in the lock's hierarchical topology (e.g., a global cohort lock for writers). In some cases, the writer thread may be given the synthetic level writer lock by another writer thread that is executing on the same node as the writer thread that is attempting to acquire the lock (e.g., according to node-fairness policy, which may be dependent on an upper bound on the number of consecutive writers on the same node). This is illustrated in FIG. 6 by the positive exit from 625. However, if the writer thread is not given the synthetic level writer lock by another writer thread that is executing on the same node (shown as the negative exit from 625), the writer thread may be able to acquire the synthetic level writer lock on its own (e.g., by competing for the synthetic level writer lock). This is illustrated in FIG. 6 by the positive exit from 630. As illustrated by the feedback from the negative exit of 630 to 625, in some embodiments the method may include the writer thread repeatedly attempting to acquire the synthetic level writer lock or waiting to be given the lock by another writer thread that is executing on the same node until it obtains the synthetic level writer lock.

If and when the writer thread acquires the synthetic level writer lock (by either of these means), the method may include the writer thread beginning an attempt to acquire the top-level reader-writer lock in the lock's hierarchical topology, as in 635. If the writer thread is given top-level lock by another writer thread that is executing on the same node (shown as the positive exit from 640), the method may include the writer thread waiting for one or more readers that are currently executing in the critical section that is protected by the reader-writer lock in read-only mode to drain, and then entering the critical section, as in 650. For example, the writer thread may obtain the top-level lock on accordance with an applicable reader-vs-writer policy (e.g., neutral preference policy), and dependent on the upper bounds that are specified for the number of consecutive readers and/or consecutive writers that can obtain the top-level lock.

If the writer thread is not given the top-level lock by another writer thread that is executing on the same node (shown as the negative exit from 640), the writer thread may be able to acquire the top-level reader-writer lock on its own (e.g., by competing for the top-level reader-writer lock). This is illustrated in FIG. 6 by the positive exit from 645. In this case, the method may include the writer thread waiting for one or more readers that are currently executing in the critical section that is protected by the reader-writer lock in read-only mode to drain, and then entering the critical section, as in 650. As illustrated by the feedback from the negative exit of 645 to 640, in some embodiments the method may include the writer thread repeatedly attempting to acquire the top-level reader-writer lock or waiting to be given the lock by another writer thread that is executing on the same node until it obtains the top-level reader-writer writer lock.

As illustrated in this example, when a writer thread wishes to obtain a NUMA-aware reader-writer lock that employs the cohort-s approach described herein, it may first obtain its local writer lock (Wx), and then may attempt to acquire the W lock on the synthetic level. There are two ways that the writer thread may be able to obtain the W lock: it may compete for the W lock, or it may be given the W lock when the current owner releases it. For example, if the current owner notices that another writer thread from the same node is waiting for lock W, it may pass lock W to that other writer. More specifically, if another writer from the same node arrives at the node-level lock that is held by the current owner, the current owner may hand off this node-level lock (e.g., the W2 lock, if the current owner and the other writer are both executing on node 2), and the other writer may not need to compete for the locks above this in the lock hierarchy (e.g., the W lock on the synthetic level and the top-level lock). Instead, the benefits of traditional lock cohorting (e.g., which attempts to keep the top-level lock with writers on the same node as long as possible to avoid lock migration) may also apply to locks that employ the cohort-s approach described herein.

Figure 7:
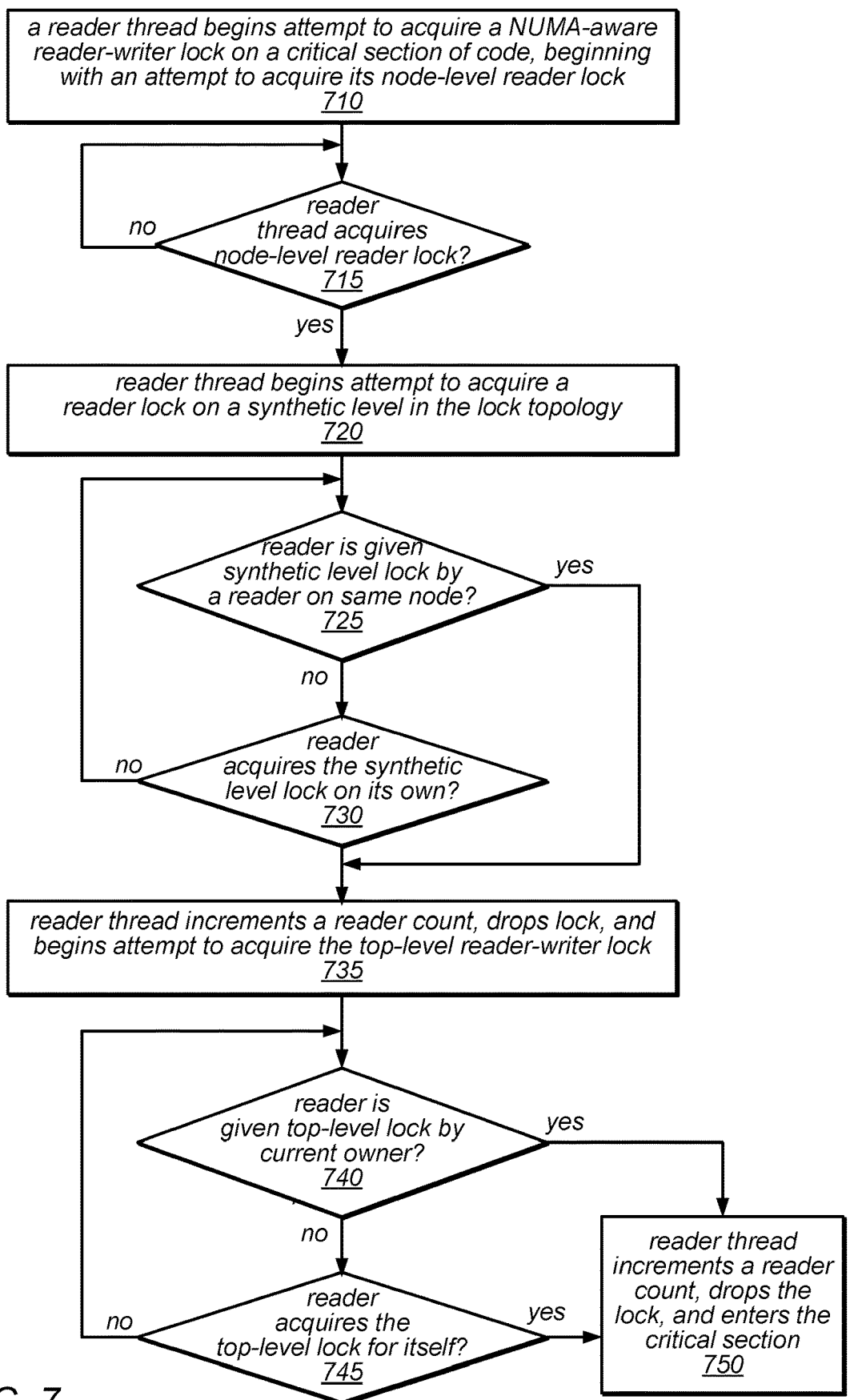
FIG. 7 is a flow diagram illustrating one embodiment of a method for a reader thread to acquire a NUMA-aware reader-writer lock, as described herein.

One embodiment of a method for a reader thread to acquire a NUMA-aware reader-writer lock is illustrated by the flow diagram in FIG. 7. As illustrated at 710, in this example, the method may include a reader thread beginning an attempt to acquire a NUMA-aware reader-writer lock on a critical section of code, which may include the reader thread beginning an attempt to acquire its local node-level reader lock. As illustrated at 715 and by the feedback from the negative exit of 715 to its input, in some embodiments the method may include the reader thread repeatedly attempting to acquire its local node-level reader lock until it is successful. Note that, as in other examples described herein, the method of acquisition may be different in different embodiments, and may be dependent on the lock type of the local node-level reader lock.

As illustrated in FIG. 7 by the positive exit of 715 and element 720, when and if the reader thread acquires its local node-level reader lock, the method may include the reader thread beginning an attempt to acquire a reader lock on a synthetic level in the lock's hierarchical topology (e.g., a global cohort lock for readers). In some cases, the reader thread may be given the synthetic level reader lock by another reader thread that is executing on the same node as the reader thread that is attempting to acquire the lock (e.g., according to node-fairness policy, which may be dependent on an upper bound on the number of consecutive readers on the same node). This is illustrated in FIG. 7 by the positive exit from 725. However, if the reader thread is not given the synthetic level reader lock by another reader thread that is executing on the same node (shown as the negative exit from 725), the reader thread may be able to acquire the synthetic level reader lock on its own (e.g., by competing for the synthetic level reader lock). This is illustrated in FIG. 7 by the positive exit from 730. As illustrated by the feedback from the negative exit of 730 to 725, in some embodiments the method may include the reader thread repeatedly attempting to acquire the synthetic level reader lock or waiting to be given the lock by another reader thread that is executing on the same node until it obtains the synthetic level reader lock.

If and when the reader thread acquires the synthetic level reader lock (by either of these means), the method may include the reader thread incrementing a reader count, dropping the synthetic level reader lock, and beginning an attempt to acquire the top-level reader-writer lock in the lock's hierarchical topology, as in 735. If the reader thread is given top-level lock by the current owner (e.g., another reader thread that is executing on the same node or on a different node), shown as the positive exit from 740, the method may include the reader thread incrementing a reader count, dropping the top-level reader-writer lock, and then entering the critical section, as in 750. For example, the reader thread may obtain the top-level lock on accordance with an applicable reader-vs-writer policy (e.g., neutral preference policy), and dependent on the upper bounds that are specified for the number of consecutive readers and/or consecutive writers that can obtain the top-level lock.

If the reader thread is not given the top-level lock by the current owner (shown as the negative exit from 740), the reader thread may be able to acquire the top-level reader-writer lock on its own (e.g., by competing for the top-level reader-writer lock). This is illustrated in FIG. 7 by the positive exit from 745. In this case, the method may include the reader thread incrementing a reader count, dropping the top-level reader-writer lock, and then entering the critical section, as in 750. As illustrated by the feedback from the negative exit of 745 to 740, in some embodiments the method may include the reader thread repeatedly attempting to acquire the top-level reader-writer lock or waiting to be given the lock by the current owner until it obtains the top-level reader-writer writer lock.

Figure 8:
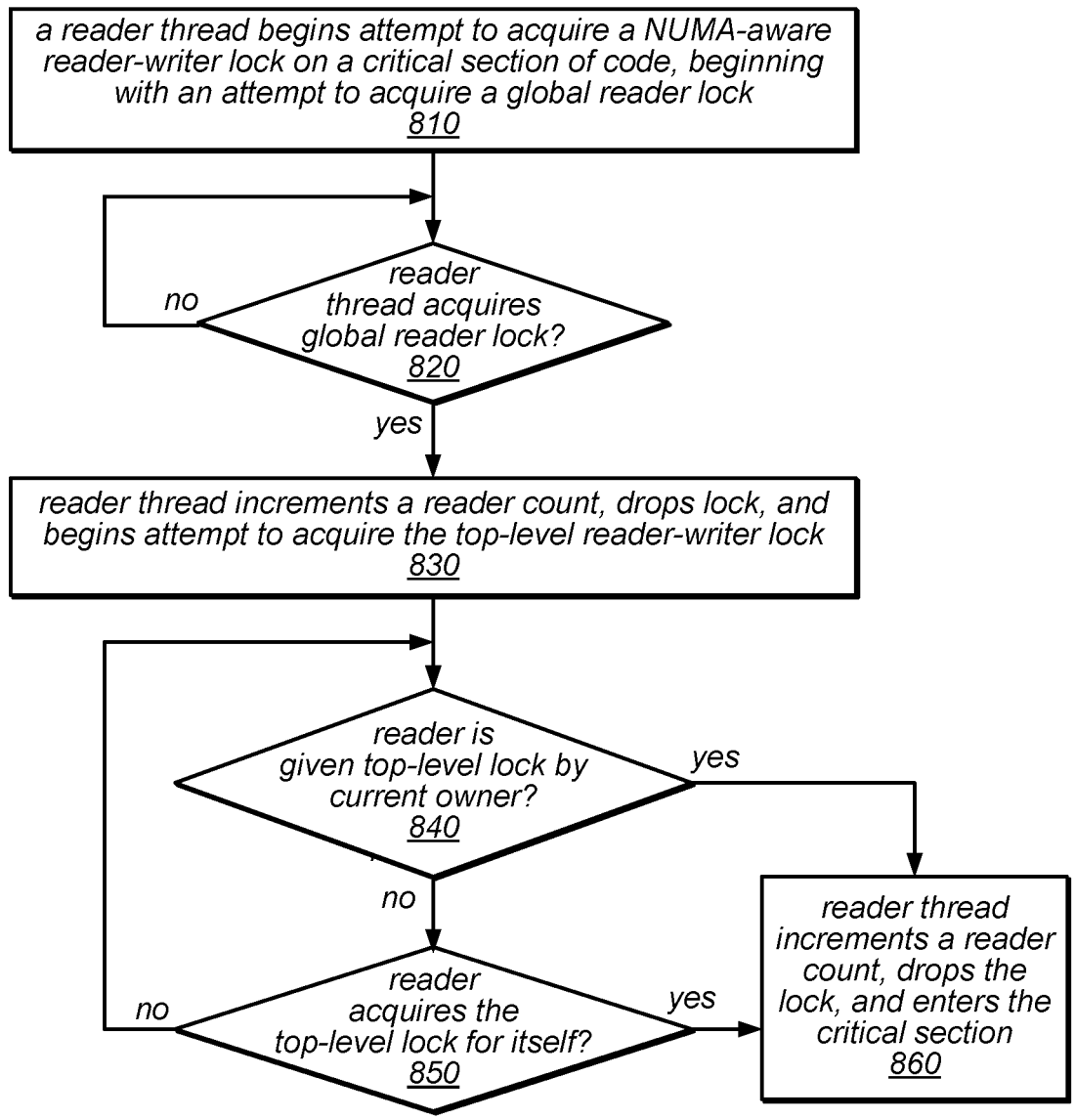
FIG. 8 is a flow diagram illustrating another embodiment of a method for a reader thread to acquire a NUMA-aware reader-writer lock, as described herein.

Another embodiment of a method for a reader thread to acquire a NUMA-aware reader-writer lock is illustrated by the flow diagram in FIG. 8. As illustrated at 810, in this example, the method may include a reader thread beginning an attempt to acquire a NUMA-aware reader-writer lock on a critical section of code, which may include the reader thread beginning an attempt to acquire a global reader lock. As illustrated at 820 and by the feedback from the negative exit of 820 to its input, in some embodiments the method may include the reader thread repeatedly attempting to acquire the global reader lock until it is successful. Note that, as in other examples described herein, the method of acquisition may be different in different embodiments, and may be dependent on the lock type of the global reader lock.

As illustrated in FIG. 8 by the positive exit of 820 and element 830, when and if the reader thread acquires the global reader lock, the method may include the reader thread incrementing a reader count, dropping the global reader lock, and beginning an attempt to acquire the top-level reader-writer lock in the lock's hierarchical topology. If the reader thread is given top-level lock by the current owner (e.g., another reader thread that is executing on the same node or on a different node), shown as the positive exit from 840, the method may include the reader thread incrementing a reader count, dropping the top-level reader-writer lock, and then entering the critical section, as in 860. For example, the reader thread may obtain the top-level lock on accordance with an applicable reader-vs-writer policy (e.g., neutral preference policy), and dependent on the upper bounds that are specified for the number of consecutive readers and/or consecutive writers that can obtain the top-level lock.

Alternatively, if the reader thread is able to acquire the top-level reader-writer lock on its own (e.g., by competing for the top-level reader-writer lock), shown as the positive exit from 850, the method may include the reader thread incrementing a reader count, dropping the top-level reader-writer lock, and then entering the critical section, as in 860. As illustrated by the feedback from the negative exit of 850 to 840, in some embodiments the method may include the reader thread repeatedly attempting to acquire the top-level reader-writer lock or waiting to be given the lock by the current owner until it obtains the top-level reader-writer writer lock.

As illustrated in these example, when a reader thread wishes to obtain a NUMA-aware reader-writer lock that employs the cohort-s approach described herein, it may first obtain its local reader lock (Rx), if the lock includes multiple node-level reader locks, after which it may attempt to obtain the R lock on the synthetic level. In some embodiments, there may be two ways that the reader thread may be able to obtain the R lock: it may compete for the R lock, or it may be given the R lock when the current owner releases it. For example, if the current owner notices that another reader thread is waiting for lock R, it may pass lock R to that other reader. In embodiments that include multiple node-level reader locks, if another reader from the same node arrives at the node-level lock that is held by the current owner, the current owner may hand off this node-level lock (e.g., the R2 lock, if the current owner and the other reader are both executing on node 2), and the other reader may not need to compete for the locks above this in the lock hierarchy (e.g., the R lock on the synthetic level and the top-level lock). In embodiments that do not include multiple node-level reader locks, an arriving reader thread may first attempt to acquire the R lock on the synthetic level (by competing for the lock or by obtaining it from the previous owner). If it receives the R lock from the current owner, it may not need to compete for the top-level lock.

As noted above, in some embodiments, multiple readers (including readers from different nodes) may be able to hold the top-level lock at the same time. However, under a neutral-preference policy, the readers may hold the lock only briefly (e.g., long enough to increment a counter to indicate that there is an additional reader) and then drop it. In such embodiments, there may only be that relatively small portion of the critical section that cannot be executed by multiple reader threads in parallel. However, the read operation in the critical section that is being protected by the lock may be executed by multiple readers in parallel. Note that, in some embodiments, if the current owner of the top-level lock is a reader, it may be able to hand off the lock to any other reader, regardless of the NUMA node on which the other reader is executing.

As described herein, cohort locks may, in some embodiments, enforce fairness using an upper bound (B) on the number of consecutive threads from the same node that can hold the lock. In some such embodiments, in order to enforce fairness, the lock implementation may include a counter whose value reflects the number of times that the lock is passed between threads executing on a single NUMA node and this counter may be incremented each time the lock is passed between threads executing on a single NUMA node. In such embodiments, until the counter reaches an upper bound on lock cohorting that is specified for the lock, the current owner may pass the lock to another thread on the same node, which may improve throughput. However, once the counter reaches the upper bound that is specified for the lock, the current owner may release the lock, allowing a thread from another node to obtain the lock. In other words, in order to achieve some amount of fairness, the current owner may occasionally have to give up the top-level lock and let a thread from another node acquire it, even if there are more threads executing on the same node that are waiting to acquire it. In some embodiments, the upper bound may, conceptually, serve as a knob to control the balance between throughput and fairness. The larger the bound, the more time the lock will stay tied to one node (which improves throughput since the lock is not migrating between NUMA nodes), but the more unfair the lock is, in terms of the threads on different nodes.

In some embodiments of the NUMA-aware reader-writer locks described herein (e.g., those that employ a cohort-s approach), there may be an upper bound on the number of writers on a single node that can consecutively hold the top-level lock, which may be specified by the lock implementer or may be configurable by an application that employs such a lock. For example, the synthetic W node may impose this bound over the node-level writer locks (e.g., W0, W1, W2, W3, in a four-node system). There may also be an upper bound on the number of readers on a single node that can consecutively hold the top-level lock, in some embodiments. In such embodiments, the synthetic R node may impose this limit over the node-level reader locks (e.g., R0, R1, R2, R3, in a four-node system). The limits (which may be enforced through the use of counters or another suitable mechanism) may be the same for readers and writers, or there may be different limits for readers than for writers, in different embodiments.

As described herein, there may also be a bound that controls the balance between readers and writers. For example, in some embodiments, there may be a counter (e.g., at the top level lock) whose value reflects the number of consecutive readers (or writers) that hold the top-level lock, and the lock implementation may enforce an upper limit on the number of consecutive readers (or writers). In some embodiments, the balance between readers and writers may be enforced by having a different handoff limit for the readers than for the writers at the synthetic level. In one example, there may be a handoff limit of 100 for readers, and a handoff limit of 10 for writers, which would give preference to readers. In this example, up to 100 readers (on the same or different nodes) may be able to obtain the top-level lock in a row, after which up to 10 writers on the same node may be able to obtain it, and so on. In yet another example, at the synthetic layer, an upper bound may enforce a limit of 10 consecutive threads on each node, but the next level up (e.g., the top-level lock) may enforce a limit of 100 reads, after which the top-level lock would be given to a writer.

Figure 9:
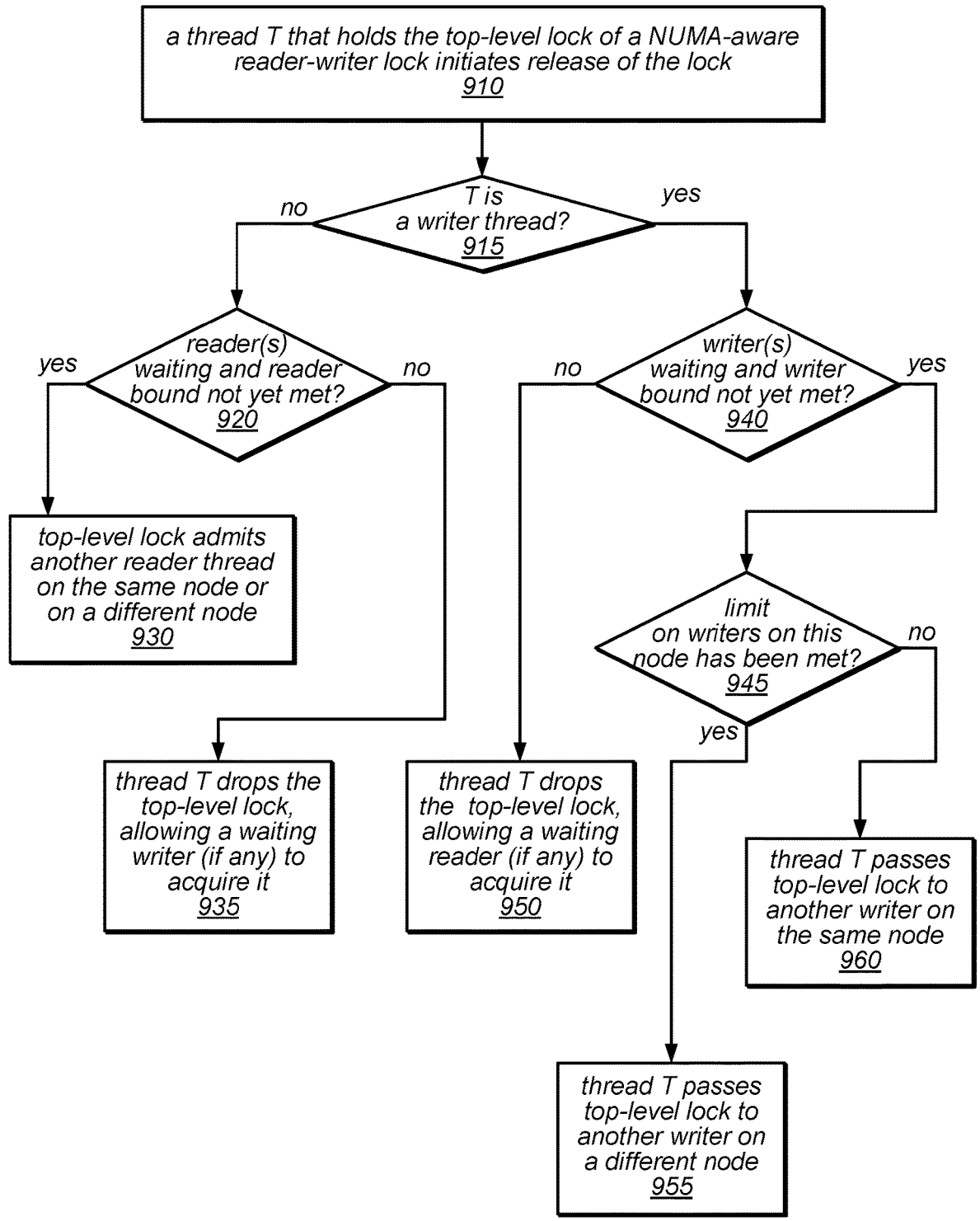
FIG. 9 is a flow diagram illustrating one embodiment of a method for a thread to release a NUMA-aware reader-writer lock, as described herein.

One embodiment of a method for a thread to release a NUMA-aware reader-writer lock is illustrated by the flow diagram in FIG. 9. As illustrated at 910, in this example, the method may include a thread T that holds the top-level lock (e.g., a cohort-s lock) in the hierarchical topology of a NUMA-aware reader-writer lock initiating the release of the lock. If thread T is a writer thread (shown as the positive exit from 915), and if there is one or more writer thread waiting to acquire the top-level reader-writer lock and an upper bound on the number of consecutive writers has not yet been met (shown as the positive exit from 940), the method may include thread T passing the top-level reader-writer lock to another writer thread (e.g., one of the writer threads that is waiting to acquire the top-level reader-writer lock). In this example, if a limit on the number of consecutive writer threads on a single node has not yet been met (shown as the negative exit of 945), the method may include thread T passing the top-level reader-writer lock to another writer thread on the same node (as in 960). However, if a limit on the number of consecutive writer threads on a single node has been met (shown as the positive exit of 945), the method may include thread T passing the top-level reader-writer lock to another writer thread on a different node (as in 955).

If thread T is a writer thread (shown as the positive exit from 915), but if there are no writers waiting to acquire the top-level reader-writer lock or if an upper bound on the number of consecutive writers has been met (shown as the negative exit from 940), the method may include thread T dropping the top-level reader-writer lock, which may allow a waiting reader thread (if there are any) to acquire it, as in 950. As described herein, in some embodiments and under certain circumstances, the method may also include thread T dropping a synthetic level writer lock and/or a local node-level writer lock (not shown).

On the other hand, if thread T is not a writer thread (e.g., if thread T is a reader thread, shown as the negative exit from 915), and if there is one or more reader thread waiting to acquire the top-level reader-writer lock and an upper bound on the number of consecutive readers has not yet been met (shown as the positive exit from 920), the method may include top-level lock admits another reader thread on the same node or on a different node, as in 930. Note that, in some embodiments, there may be multiple readers holding the node-level lock at the same time (depending on the lock type).

If thread T is a reader thread (shown as the negative exit from 915), but if there are no readers waiting to acquire the top-level reader-writer lock or if an upper bound on the number of consecutive readers has been met (shown as the negative exit from 920), the method may include thread T dropping the top-level reader-writer lock, which may allow a waiting writer thread (if there are any) to acquire the top-level reader-writer lock, as in 935. As described herein, in some embodiments and under certain circumstances, the method may also include thread T dropping a synthetic level reader lock and/or a local node-level reader lock (not shown).

As noted above, using different hand-off bound values (B) for the R and W nodes may give considerable expressive power to the admission policy. Put another way, the hand-off bound B in the R and W nodes may be used to provide fine-grain balance between reader and writer preference, while ensuring that neither class starves. In various embodiments, there may be different criteria for determining how to balance between readers and writers, e.g., for different workloads. In some embodiments, the policy (and corresponding bounds) may result in alternating between with a small set of readers and a small (e.g., equally sized) set of writers (e.g., admitting 10 readers and then 10 writers). This would provide some parallelism and would be perfectly fair over the long term.

In another example, the developer may know that, in a certain application, readers are far more important than writers. In this case, the developer may give the readers a much bigger share of the lock acquisitions by setting a very large upper bound on the number of writers, and a much smaller upper bound for the writers (e.g., upper bounds of 1000 readers and 2 writers). In another example, e.g., in a situation in which it may be important for the writers to be able to insert fresh data into a data structure that is being protected by the lock, it may be desirable for writers to have preference over readers. In some embodiments, one or more of the limits described herein (e.g., an upper bound on the number of consecution reader or writer threads from the same node that can hold the lock or a bound that controls the balance between readers and writers) may be dynamically configurable (and modifiable) at runtime. In such embodiments, these bounds may be tunable parameters of the lock implementation, which may be initialized (e.g., by the lock writer, as a default, or by the application developer), and the application writer, who may have a better idea of the criteria that would be suitable for deciding when and/or whether to change them, may be able to modify them during operation. For example, the application writer may include a routine to monitor performance, and to adjust these parameters to improve performance. In one example, the application in which the cohort-s reader-writer locks described herein are implemented may be a web server and it may be important to be able to enforce particular imbalances between readers and writers and/or between nodes, at different times and under specific circumstances.

In general, there may be a variety of ways to use parameters to specify these bounds, including, but not limited to, to following:
  The lock developer may define the bounds for a particular lock and these values may be fixed for that lock.
  The application developer may (in their software) be able to set the values when initializing the locks (e.g., an initialize routine may be able to set the value or override a default value that was defined by the lock writer).
  The application developer may be able to change these values dynamically during operation.

Initial testing has shown that a reader-writer lock that combines C-RW-NP with the cohort-s approach described herein yields better results than the C-RW-WP lock (which was previously shown to be a high-performing reader-writer lock) on key-value store benchmarks. In some embodiments, the use of C-RW-NP with cohort-s may obviate the use of the C-RW-WP approach and may make the system less sensitive to lock tunables.

Example System

Figure 10:
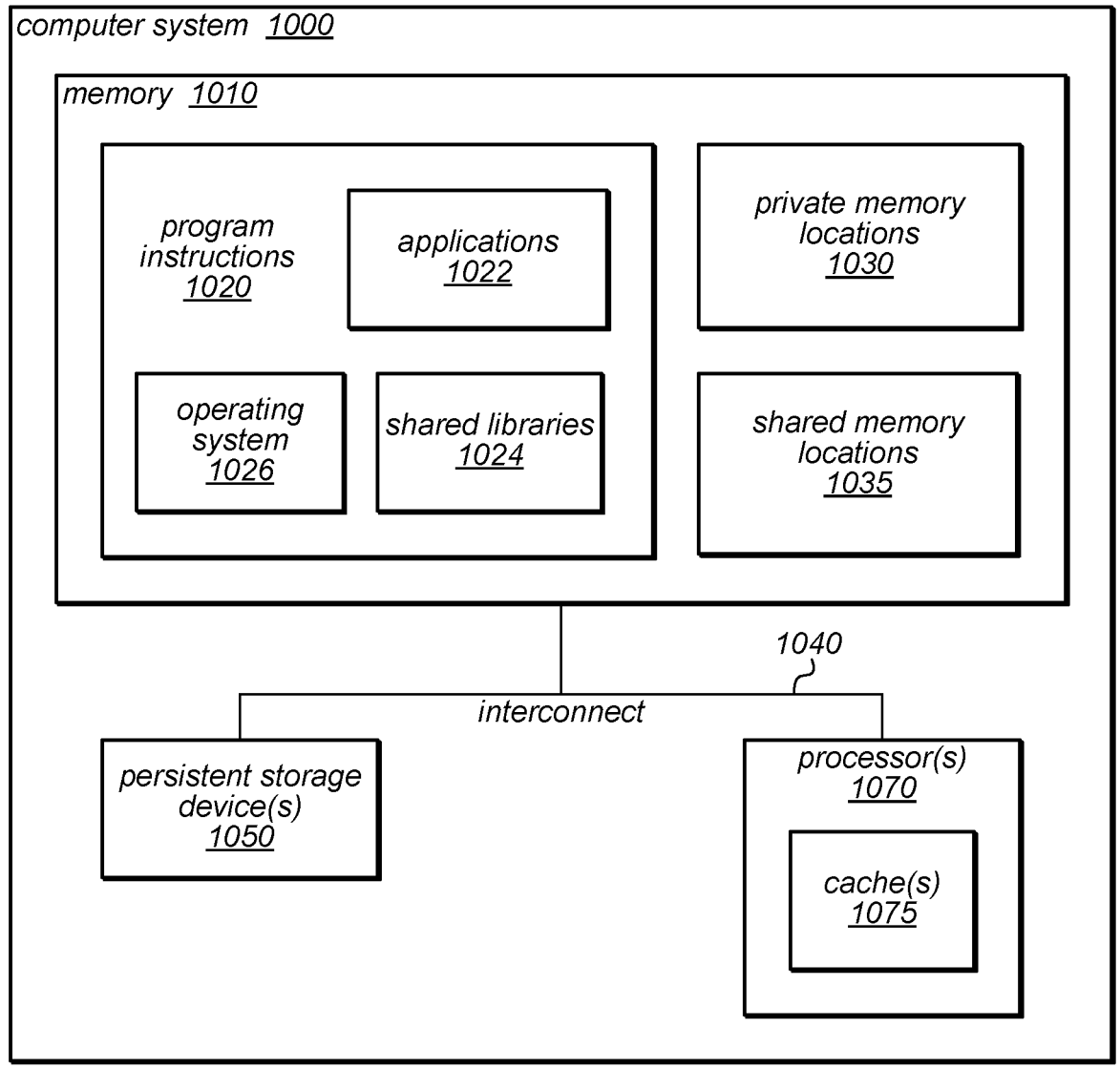
FIG. 10 illustrates a computing system configured to implement at least some of the mechanisms and techniques described herein, according to various embodiments.

FIG. 10 is a block diagram illustrating a computing system that is configured to implement at least some of the mechanisms and techniques described herein, according to various embodiments. The computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing NUMA-aware cohort locking and/or NUMA-aware reader-writer locks (including those that employ a cohort-s approach), as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1000 may include one or more processors 1070; each may include multiple cores, any of which may be single or multi-threaded. For example, as illustrated in FIG. 1, multiple processor cores may be included in a single processor chip (e.g., a single processor 1070 or processor chip 110), and multiple processor chips may be included on a CPU board, two or more of which may be included in computer system 1000. Each of the processors 1070 may include a hierarchy of caches, in various embodiments. For example, as illustrated in FIG. 1, each processor chip 110 may include multiple L1 caches (e.g., one per processor core) and one or more other caches (which may be shared by the processor cores on the processor chip). The computer system 1000 may also include one or more persistent storage devices 1050 (e.g. optical storage, magnetic storage, hard drive, tape drive, solid state memory, etc) and one or more system memories 1010 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 10 (e.g., video cards, audio cards, additional network interfaces, peripheral devices, a network interface such as an ATM interface, an Ethernet interface, a Frame Relay interface, etc.)

The one or more processors 1070, the storage device(s) 1050, and the system memory 1010 may be coupled to the system interconnect 1040. One or more of the system memories 1010 may contain program instructions 1020. Program instructions 1020 may be executable to implement one or more applications 1022 (which may include one or more accesses to a critical section of code or shared resource protected by a NUMA-aware reader-writer lock that employs a cohort-s approach, as described herein), shared libraries 1024, or operating systems 1026. In some embodiment, program instructions 1020 may be executable to implement a contention manager (not shown). Program instructions 1020 may be encoded in platform native binary, any interpreted language such as Java™ byte-code, or in any other language such as C/C++, Java™, etc or in any combination thereof. The program instructions 1020 may include functions, operations and/or other processes for implementing NUMA-aware cohort locking and/or NUMA-aware reader-writer locks (including those that employ a cohort-s approach), as described herein. Such support and functions may exist in one or more of the shared libraries 1024, operating systems 1026, or applications 1022, in various embodiments. The system memory 1010 may further comprise private memory locations 1030 and/or shared memory locations 1035 where data may be stored. For example, shared memory locations 1035 may store data accessible to concurrently executing threads, processes, or transactions, in various embodiments. In addition, the system memory 1010 and/or any of the caches of processor(s) 1070 may, at various times, store lock metadata (e.g., lock state information or lock structure header information for node-level, synthetic-level and/or top-level locks in a hierarchical reader-writer lock topology, identifiers of successor threads, and/or various counters or flags, as described herein), threshold values (specifying, for example, an upper bound on the number of consecutive reader threads, writer threads, or threads from the same node that can hold a node-level, synthetic-level and/or top-level lock, policy parameter values, maximum count values, lists or queues of pending, active, and/or passive threads, lists of locks currently held for reading by particular threads, one or more reader counters (e.g., a node-local reader counter), and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of locks and structures and particular locking algorithms and policies, it should be noted that the techniques and mechanisms disclosed herein for implementing NUMA-aware lock cohorting and NUMA-aware reader-writer locks (including those that employ a cohort-s approach) may be applicable in other contexts in which critical sections of code and/or shared resources may be protected by other types of locks/structures under different locking algorithms/policies, or in which cohort locks or NUMA-aware reader-writer locks are constructed from different types of locks and structures than those described in the examples herein. It is intended that the following claims be interpreted to embrace all such variations and modifications.

What is claimed:

1. A method, comprising:
    determining, by a writer thread holding a top-level lock of a hierarchical reader-writer lock, that an upper bound on a number of writer threads consecutively holding the top-level lock has not been met, and responsive to the determining:
        granting acquisition, by the writer thread to a waiting writer thread executing on a computing node also executing the writer thread, of the top-level lock to perform one or more write operations to a shared data structure responsive to determining that an upper bound on a number of writer threads executing on the computing node consecutively holding the top-level lock has not been met; and
    granting acquisition, by the writer thread to another waiting writer thread executing on another computing node different from the computing node executing the writer thread, of the top-level lock to perform one or more other write operations to the shared data structure responsive to determining that an upper bound on a number of writer threads executing on the computing node consecutively holding the top-level lock has been met.

2. The method of claim 1, wherein granting acquisition of the top-level lock is performed as the writer thread holds the top-level lock.

3. The method of claim 1, further comprising:
    releasing, by the writer thread, the top-level lock responsive to determining that an upper bound on a number of writer threads consecutively holding the top-level lock has been met.

4. The method of claim 1, further comprising:
    acquiring the hierarchical reader-writer lock by the writer thread, wherein the hierarchical reader-writer lock comprises a hierarchy including at least a first level and a second level, and wherein the acquiring comprises:
        acquiring a global writer lock at the second level in the multiple-level lock hierarchy, the second level comprising the global writer lock and a global reader lock, wherein at most one writer thread holds the global writer lock at a time; and
        acquiring, subsequent to acquiring the global writer lock, the top-level lock at the first level in the multiple-level lock hierarchy, wherein at most one writer thread or one reader thread holds the top-level lock at a time.

5. The method of claim 1, further comprising:
    determining, by a reader thread holding the top-level lock, that an upper bound on a number of reader threads consecutively holding the top-level lock has not been met, and responsive to the determining:
        granting acquisition, by the reader thread to a waiting reader thread, of the top-level lock to perform one or more write operations to a shared data structure responsive to determining that an upper bound on a number of reader threads consecutively holding the top-level lock has not been met; and
        releasing, by the reader thread, the top-level lock responsive to determining that an upper bound on a number of readers consecutively holding the top-level lock has been met.

6. The method of claim 5, wherein the waiting reader thread executes on a particular computing node also executing the reader thread.

7. The method of claim 5, further comprising:
    acquiring the hierarchical reader-writer lock by the reader thread, wherein the hierarchical reader-writer lock comprises hierarchy including at least a first level and a second level, and wherein the acquiring comprises:
        acquiring a global reader lock at the second level in the multiple-level lock hierarchy, the second level comprising a global writer lock and the global reader lock; and
        acquiring, subsequent to acquiring the global reader lock, the top-level lock at the first level in the multiple-level lock hierarchy, wherein at most one writer thread or one reader thread holds the top-level lock at a time.

8. One or more non-transitory, computer-readable storage media storing program instructions that when executed on or across one or more computers cause the one or more computers to perform:
  determining, by a writer thread holding a top-level lock of a hierarchical reader-writer lock, that an upper bound on a number of writer threads consecutively holding the top-level lock has not been met, and responsive to the determining:
    granting acquisition, by the writer thread to a waiting writer thread executing on a computing node also executing the writer thread, of the top-level lock to perform one or more write operations to a shared data structure responsive to determining that an upper bound on a number of writer threads executing on the computing node consecutively holding the top-level lock has not been met; and
    granting acquisition, by the writer thread to another waiting writer thread executing on another computing node different from the computing node executing the writer thread, of the top-level lock to perform one or more other write operations to the shared data structure responsive to determining that an upper bound on a number of writer threads executing on the computing node consecutively holding the top-level lock has been met.

9. The one or more non-transitory, computer-readable storage media of claim 8, wherein granting acquisition of the top-level lock is performed as the writer thread holds the top-level lock.

10. The one or more non-transitory, computer-readable storage media of claim 8, further storing program instructions that when executed on or across one or more computers cause the one or more computers to perform:
  releasing, by the writer thread, the top-level lock responsive to determining that an upper bound on a number of writer threads consecutively holding the top-level lock has been met.

11. The one or more non-transitory, computer-readable storage media of claim 8, further storing program instructions that when executed on or across one or more computers cause the one or more computers to perform:
  acquiring the hierarchical reader-writer lock by the writer thread, wherein the hierarchical reader-writer lock comprises a hierarchy including at least a first level and a second level, and wherein the acquiring comprises:
    acquiring a global writer lock at the second level in the multiple-level lock hierarchy, the second level comprising the global writer lock and a global reader lock, wherein at most one writer thread holds the global writer lock at a time; and
    acquiring, subsequent to acquiring the global writer lock, the top-level lock at the first level in the multiple-level lock hierarchy, wherein at most one writer thread or one reader thread holds the top-level lock at a time.

12. The one or more non-transitory, computer-readable storage media of claim 8, further storing program instructions that when executed on or across one or more computers cause the one or more computers to perform:
  determining, by a reader thread holding the top-level lock, that an upper bound on a number of reader threads consecutively holding the top-level lock has not been met, and responsive to the determining:
    granting acquisition, by the reader thread to a waiting reader thread, of the top-level lock to perform one or more write operations to a shared data structure responsive to determining that an upper bound on a number of reader threads consecutively holding the top-level lock has not been met; and
    releasing, by the reader thread, the top-level lock responsive to determining that an upper bound on a number of readers consecutively holding the top-level lock has been met.

13. The one or more non-transitory, computer-readable storage media of claim 12, wherein the waiting reader thread executes on a particular computing node also executing the reader thread.

14. The one or more non-transitory, computer-readable storage media of claim 12, further storing program instructions that when executed on or across one or more computers cause the one or more computers to perform:
  acquiring the hierarchical reader-writer lock by the reader thread, wherein the hierarchical reader-writer lock comprises hierarchy including at least a first level and a second level, and wherein the acquiring comprises:
    acquiring a global reader lock at the second level in the multiple-level lock hierarchy, the second level comprising a global writer lock and the global reader lock; and
    acquiring, subsequent to acquiring the global reader lock, the top-level lock at the first level in the multiple-level lock hierarchy, wherein at most one writer thread or one reader thread holds the top-level lock at a time.

15. A system, comprising:
  a plurality of nodes respectively comprising two or more processor cores that support multithreading;
  a system memory coupled to the plurality of nodes, the system memory storing program instructions that when executed on one or more processor cores in the plurality of nodes cause the one or more processor cores to implement an application comprising a plurality of concurrently executing threads, the application configured to:
  determine, by a writer thread of the plurality of concurrently executing threads holding a top-level lock of a hierarchical reader-writer lock, that an upper bound on a number of writer threads consecutively holding the top-level lock has not been met, and responsive to the determining:
    grant acquisition, by the writer thread to a waiting writer thread of the plurality of concurrently executing threads executing on a computing node also executing the writer thread, of the top-level lock to perform one or more write operations to a shared data structure responsive to determining that an upper bound on a number of writer threads executing on the computing node consecutively holding the top-level lock has not been met; and
    grant acquisition, by the writer thread to another waiting writer thread of the plurality of concurrently executing threads executing on another computing node different from the computing node executing the writer thread, of the top-level lock to perform one or more other write operations to the shared data structure responsive to determining that an upper bound on a number of writer threads executing on the computing node consecutively holding the top-level lock has been met.

16. The system of claim 15, wherein granting acquisition of the top-level lock is performed as the writer thread holds the top-level lock.

17. The system of claim 15, wherein the application is further configured to release, by the writer thread, the top-level lock responsive to determining that an upper bound on a number of writer threads consecutively holding the top-level lock has been met.

18. The system of claim 15, wherein the application is further configured to acquire the hierarchical reader-writer lock by the writer thread, wherein the hierarchical reader-writer lock comprises a hierarchy including at least a first level and a second level, and wherein to acquire the hierarchical reader-writer lock the writer thread is configured to:
    acquire a global writer lock at the second level in the multiple-level lock hierarchy, the second level comprising the global writer lock and a global reader lock, wherein at most one writer thread holds the global writer lock at a time; and
    acquire, subsequent to acquiring the global writer lock, the top-level lock at the first level in the multiple-level lock hierarchy, wherein at most one writer thread or one reader thread holds the top-level lock at a time.

19. The system of claim 15, wherein the application is further configured to:
    determine, by a reader thread of the plurality of concurrently executing threads holding the top-level lock, that an upper bound on a number of reader threads consecutively holding the top-level lock has not been met, and responsive to the determining:
    grant acquisition, by the reader thread to a waiting reader thread of the plurality of concurrently executing threads, of the top-level lock to perform one or more write operations to a shared data structure responsive to determining that an upper bound on a number of reader threads consecutively holding the top-level lock has not been met; and
    release, by the reader thread, the top-level lock responsive to determining that an upper bound on a number of readers consecutively holding the top-level lock has been met.

20. The system of claim 19, wherein the application is further configured to acquire the hierarchical reader-writer lock by the reader thread, wherein the hierarchical reader-writer lock comprises hierarchy including at least a first level and a second level, and wherein to acquire the hierarchical reader-writer lock the reader thread is configured to:
    acquire a global reader lock at the second level in the multiple-level lock hierarchy, the second level comprising a global writer lock and the global reader lock; and
    acquire, subsequent to acquiring the global reader lock, the top-level lock at the first level in the multiple-level lock hierarchy, wherein at most one writer thread or one reader thread holds the top-level lock at a time.

* * * * *

UNITED STATES PATENT AND TRADEMARK OFFICE
CERTIFICATE OF CORRECTION

PATENT NO. : 12,099,885 B2  
APPLICATION NO. : 18/365880  
DATED : September 24, 2024  
INVENTOR(S) : Dice et al.

Page 1 of 1

It is certified that error appears in the above-identified patent and that said Letters Patent is hereby corrected as shown below:

On the Title Page

In page 2, Column 1, item (56) under other publications, Line 5, delete "Sychronization" and insert -- Synchronization --, therefor.

In page 2, Column 1, item (56) under other publications, Line 9, delete "Reort" and insert -- Report --, therefor.

In page 2, Column 2, item (56) under other publications, Line 1, delete "Synchronzation" and insert -- Synchronization --, therefor.

In page 2, Column 2, item (56) under other publications, Line 7, delete ""Hierarchial" and insert -- "Hierarchical --, therefor.

In the Specification

In Column 11, Line 57, delete "1200," and insert -- 120f), --, therefor.

In Column 15, Line 8, delete "<read" and insert -- 5: <read --, therefor.

Signed and Sealed this  
Twenty-first Day of January, 2025

Coke Morgan Stewart  
*Acting Director of the United States Patent and Trademark Office*